(12) United States Patent
Woytowitz

(10) Patent No.: US 8,773,030 B2
(45) Date of Patent: Jul. 8, 2014

(54) LOW VOLTAGE OUTDOOR LIGHTING POWER SOURCE AND CONTROL SYSTEM

(75) Inventor: Peter J. Woytowitz, San Diego, CA (US)

(73) Assignee: Hunter Industries, Inc., San Marcos, CA (US)

( * ) Notice: Subject to any disclaimer, the term of this patent is extended or adjusted under 35 U.S.C. 154(b) by 778 days.

(21) Appl. No.: 12/564,840

(22) Filed: Sep. 22, 2009

(65) Prior Publication Data

US 2010/0084985 A1  Apr. 8, 2010

Related U.S. Application Data

(60) Provisional application No. 61/102,261, filed on Oct. 2, 2008, provisional application No. 61/218,883, filed on Jun. 19, 2009.

(51) Int. Cl.
*H05B 37/02* (2006.01)

(52) U.S. Cl.
USPC ........... 315/210; 315/224; 315/291; 315/294; 315/297

(58) Field of Classification Search
USPC .................. 315/291, 293, 294, 297, 210
See application file for complete search history.

(56) References Cited

U.S. PATENT DOCUMENTS

| | | | |
|---|---|---|---|
| 4,007,458 A | 2/1977 | Hollabaugh | 340/310 |
| 6,188,181 B1 * | 2/2001 | Sinha et al. | 315/293 |
| 7,084,741 B2 | 8/2006 | Plummer | 340/310.11 |
| 7,358,626 B2 | 4/2008 | Gardner et al. | 307/40 |
| 2003/0219952 A1 * | 11/2003 | Fujimaki | 438/322 |
| 2005/0023536 A1 * | 2/2005 | Shackle | 257/79 |
| 2005/0195768 A1 * | 9/2005 | Petite et al. | 370/335 |
| 2007/0253226 A1 * | 11/2007 | Fukumoto | 363/16 |
| 2008/0164827 A1 * | 7/2008 | Lys | 315/250 |
| 2008/0290251 A1 * | 11/2008 | Deurenberg et al. | 250/201.1 |
| 2008/0309244 A1 * | 12/2008 | Hsu | 315/219 |
| 2009/0195063 A1 * | 8/2009 | Joseph et al. | 307/1 |
| 2009/0195064 A1 | 8/2009 | Joseph et al. | 307/1 |
| 2009/0195164 A1 | 8/2009 | Joseph | 315/151 |
| 2009/0195179 A1 | 8/2009 | Joseph et al. | 315/287 |
| 2009/0195192 A1 * | 8/2009 | Joseph | 315/307 |
| 2009/0261750 A1 * | 10/2009 | Hsueh et al. | 315/291 |
| 2009/0284184 A1 * | 11/2009 | Valois et al. | 315/312 |
| 2010/0052568 A1 * | 3/2010 | Cohen | 315/294 |

\* cited by examiner

*Primary Examiner* — Douglas W Owens
*Assistant Examiner* — Jonathan Cooper
(74) *Attorney, Agent, or Firm* — Knobbe, Martens, Olson & Bear, LLP

(57) ABSTRACT

A power source and control system is particularly suited for use in an outdoor landscape lighting system. The power source and control system includes at least one switching mode AC-to-DC power supply having an additional output stage for efficiently converting the DC output signal into another relatively low frequency AC signal for transmission to a plurality of buried power conductors. A Manchester encoded control signal is encoded at a relatively high frequency onto the AC signal sent over the buried power conductors so that intelligent LED lighting fixtures can be powered by the AC signal and selectively have their intensity changed when they decode the control signal.

10 Claims, 23 Drawing Sheets

| 1 | LG | LF | AF | N - 5 MSB's | N - 8 LSB's | IL | CS | 0 |
|---|----|----|----|-------------|-------------|----|----|---|
| Start Bit | Bit 32 | Bit 31 | Bit 30 | Bits 29-25 | Bits 24-17 | Bits 16-9 | Bits 8-1 | Stop Bit |

*FIG. 20*

| 1 | 1 | 0 | 0 | 0 | 0 | 0 | 0 | 0 | 0 | 0 | 0 | 1 | 0 | 0 | 1 | 0 | 1 | 1 | 0 | 0 | 1 | 0 | 0 | 0 | 0 | 1 | 1 | 0 | 1 | 0 | 1 | 0 |
|---|---|---|---|---|---|---|---|---|---|---|---|---|---|---|---|---|---|---|---|---|---|---|---|---|---|---|---|---|---|---|---|---|
| LG | LF | AF | Lighting Group Number = 1 | | | | | | | | | | | Intensity Level = 50% | | | | | | | | | Checksum | | | | | | | | | |

*FIG. 21*

| 1 | 0 | 1 | 0 | 0 | 0 | 0 | 0 | 0 | 0 | 0 | 1 | 0 | 0 | 0 | 1 | 1 | 0 | 0 | 1 | 0 | 0 | 0 | 0 | 1 | 1 | 1 | 0 | 1 | 0 | 0 | 0 | 0 |
|---|---|---|---|---|---|---|---|---|---|---|---|---|---|---|---|---|---|---|---|---|---|---|---|---|---|---|---|---|---|---|---|---|
| LG | LF | AF | Lighting Fixture Number = 8 | | | | | | | | | | | Intensity Level = 100% | | | | | | | | | Checksum | | | | | | | | | |

*FIG. 22*

LOW VOLTAGE OUTDOOR LIGHTING POWER SOURCE AND CONTROL SYSTEM

CROSS-REFERENCES TO RELATED APPLICATIONS

This application is filed pursuant to 37 C.F.R. 1.53(b) and claims the benefit under 35 U.S.C. §119(e) of U.S. Provisional Application No. 61/102,261 filed Oct. 2, 2008 entitled "Low Voltage Outdoor Lighting Power Source/System" and U.S. Provisional Application No. 61/218,883 filed Jun. 19, 2009 entitled "Intelligent Landscape Light with Embedded Decoder."

BACKGROUND OF THE INVENTION

1. Field of the Invention

This invention relates generally to outdoor lighting systems and more particularly to a power source and control system suitable for supplying power to present or next generation outdoor lighting fixtures.

2. Description of the Related Art

Outdoor lighting is popular for security, aesthetic, safety, and other reasons. Energy efficient power sources are desirable, and required by law for certain applications in certain areas.

Until recently, outdoor lighting fixtures housed, almost exclusively, 12V incandescent light bulbs. These bulbs are not very efficient because they generate significant heat. Aside from the in-efficiency issue, this heat needed to be kept in mind when designing the fixture itself, particularly those fixtures made out of plastic.

There are other well-known problems with incandescent bulbs. They often have a short life in outdoor landscape lighting systems and therefore need frequent replacement. Incandescent bulbs can only achieve different colors using shaded lenses. They have a limited "linear" range for intensity changes. This means that they can be dimmed only over a narrow range without big losses of efficiency.

Presently, the typical outdoor lighting power supply consists of a step-down trans-former used to generate 12VAC from 120VAC. Typically the transformer also has a timer either built into its enclosure, or next to it. The timer is used to switch power to the transformer ON and OFF to control all of the lights simultaneously. These devices are popular because they provide a safe, low voltage output that is galvanically isolated from the main 120VAC input line. This allows the simple unprotected burial of the output wiring from these transformers at no particular depth without creating a safety hazard. If, on the other hand, the 120VAC power was to be routed to each load, it would have to be buried at a specific depth and in most cases, run through some sort of approved conduit. While local codes may vary, this is generally the case.

While fairly safe, conventional outdoor lighting power supplies are bulky, heavy, and not very efficient. The efficiency of a transformer is simply (output power)/(input power). All transformers have losses resulting in efficiencies less than 100%. The "lost" power is typically dissipated as heat in the transformer. The type and size of transformers used in outdoor lighting applications, which typically fall in the 100 W to 1000 W range, have full load efficiencies from 75%-85%. However, as the load varies, this efficiency decreases greatly. For instance, a 600 W transformer with no load connected may draw as much as 5 or 10 W from the 120VAC main. The efficiency is actually 0% for this no-load scenario and the entire 5-10 W is "wasted" power. Also, a transformer does a poor job of regulating its output voltage. Output voltage is proportional to input voltage, and also affected greatly by load. For instance, a 600 W 12VAC transformer may put out 12VAC, but only when it is loaded to 600 W. If it is only loaded to 300 W, its output may be 15VAC or more, which can shorten the life of incandescent bulbs. This makes it problematic for the end user to "oversize" the transformer to account for plans to later add more lighting powered by the same system.

New devices are now becoming available for emitting light such as high intensity Light Emitting Diodes (LEDs). Some of these device last longer, are more versatile and are more efficient than the typical incandescent bulb. But existing power supplies and lighting control systems are primarily adapted to powering incandescent lights and generally unsuitable for fully exploiting the many performance advantages of these newer light sources over incandescent bulbs.

SUMMARY OF THE INVENTION

The present invention provides a power source and control system that is particularly suited for use in an outdoor landscape lighting system. The power source and control system includes at least one switching mode AC-to-DC power supply having an additional output stage for efficiently converting the DC output signal into another relatively low frequency AC signal for transmission to a plurality of buried power conductors. An encoded control signal is encoded at a relatively high frequency onto the AC signal sent over the buried power conductors so that intelligent LED lighting fixtures can be powered by the AC signal and selectively have their intensity changed when they decode the control signal.

BRIEF DESCRIPTION OF THE DRAWINGS

FIG. 20 is a chart illustrating a protocol that may be used with Manchester encoded data in order to send a control signal to a plurality of lighting fixtures in a landscape lighting system.

FIG. 21 illustrates a first sample message that may be encoded using the protocol illustrated in FIG. 20.

FIG. 22 illustrates a second sample message that may be encoded using the protocol illustrated in FIG. 20.

DETAILED DESCRIPTION

The present invention provides a power source and control system for powering outdoor lighting fixtures that is backward-compatible with existing incandescent bulbs and particularly advantageous with newer light sources, such as LEDs, because it exploits the additional versatility of these newer light sources.

In recent years, LED lighting has become popular. LEDs can be more efficient than incandescent bulbs, and last much longer. There are other important advantages to using LEDs in landscape lighting systems. LEDS are available in several colors, and have a much greater "linear" range than incandescent bulbs. This means that they can be dimmed over a fairly wide range while maintaining high efficiency.

Disadvantageously, LEDs are very useful but they are typically powered by simple 120VAC/12VAC transformers. The 12VAC voltage is rectified (to DC) at the lighting fixture, and used to power the LED.

Figure 1:
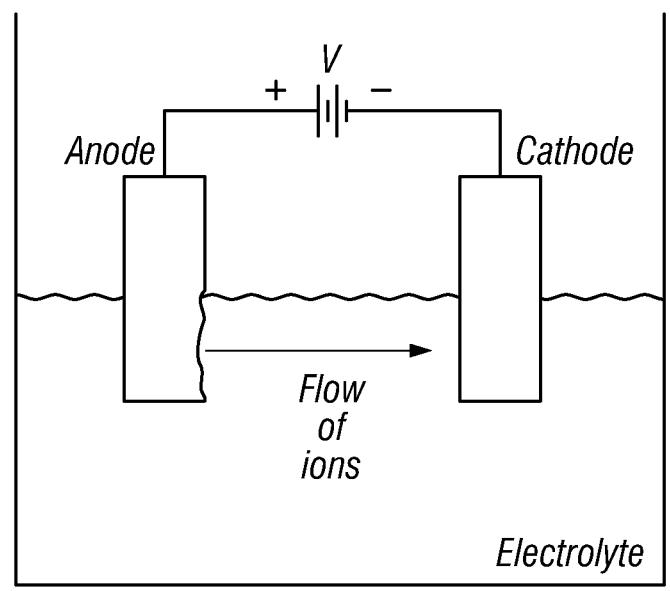
FIG. 1 is a schematic diagram illustrating the chemical process of galvanic corrosion.

While both LEDs and incandescent bulbs can be powered by direct current (DC), using DC signals in outdoor applications poses other challenges. It is well known that any two conductors having a DC (direct current) potential between them generate electrolysis leading to galvanic corrosion when they come into contact with a conductive liquid. This process arises from the anode (positive-charged conductor) giving up positive ions to the cathode (negative-charged conductor). These transferred ions use the conductive liquid as a conduit to travel from anode to cathode and is illustrated in FIG. 1. Such electrolysis was observed (although not understood) when boats were first clad with copper, which was held in place using iron nails. These two dissimilar metals, when placed in salt water formed a crude battery, with the iron nails acting as the anode, and the copper clad as the cathode. The result was that before long, all the iron nails had disintegrated through transfer of the iron as ions to the copper cathode. The same process can occur in two conductors of the same metal when a DC potential is applied between them. The end result is corrosion and eventual disappearance of the anode. Electrical isolation of the conductors from the liquid electrolyte prevents this process but the insulation of buried wires can break down chemically or be nicked during installation, and buried splices are not always properly waterproofed so any type of buried wire carrying a DC signal is very susceptible to electrolysis by contact with the natural (and applied) water in the soil. The term "buried" as used herein in reference to power conductors that extend to landscape lighting refers to subterranean or underground conductors typically placed into the soil a relatively shallow depth below the surface of the ground. Minerals in the soil enhance its conductivity and speed the electrolysis process. This is a compelling reason for not using DC signals in buried conductors such as outdoor lighting cables.

Figure 2:
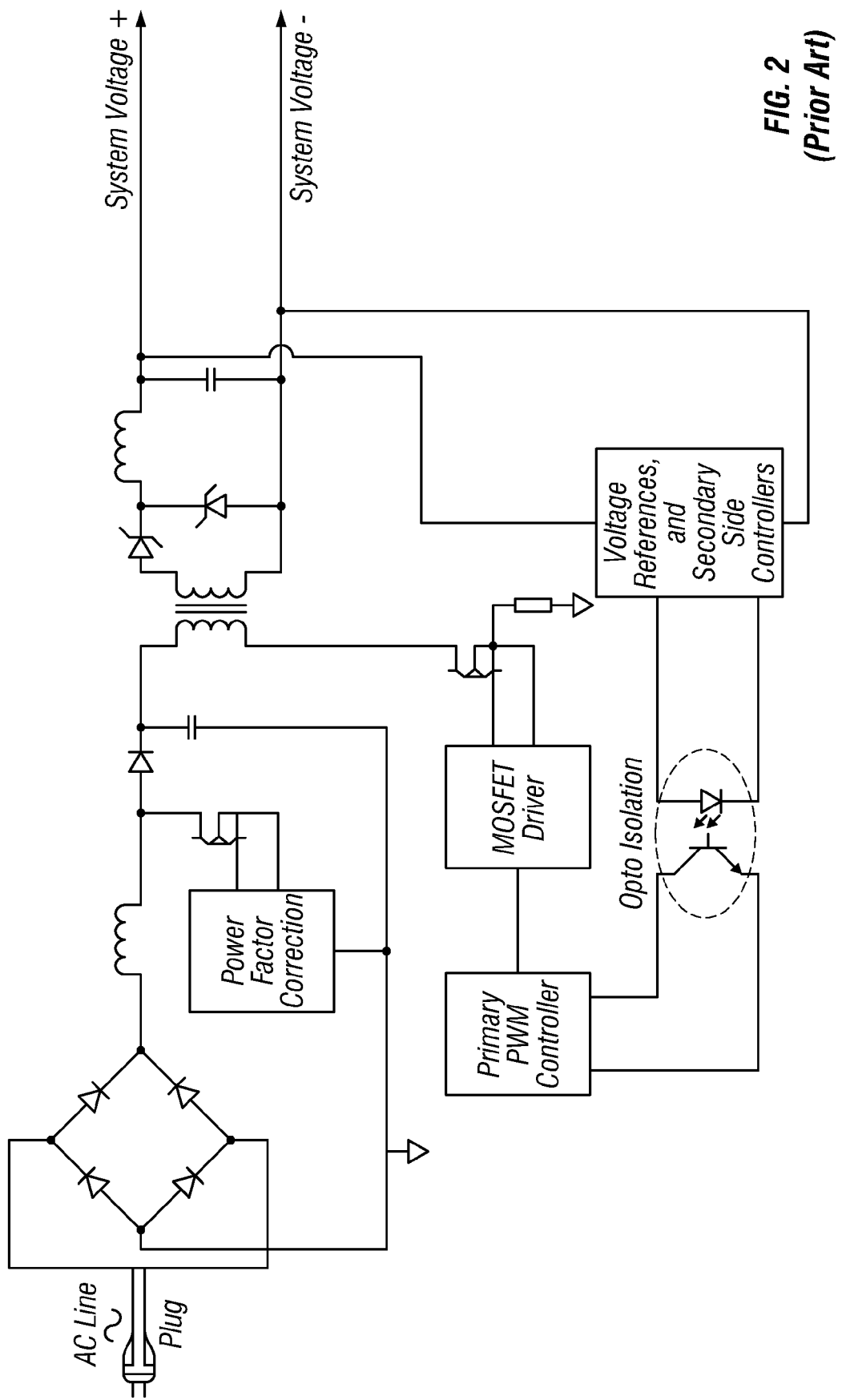
FIG. 2 is a block diagram illustrating a conventional switching mode AC/DC power supply.

Conventional AC/DC power supplies have some significant advantages over simple transformers. This is particularly true for the switching mode power supply. A block diagram of a conventional switching mode AC/DC power supply is illustrated in FIG. 2. This power supply converts an incoming high voltage AC signal to a high voltage DC signal through rectification and filtering before rapidly switching (typically at a frequency of between about 50 kHz to about 1 MHz) the high-voltage DC signal for transfer through a high frequency transformer. The relatively high switching frequency permits the use of a transformer with a very small physical size that is relatively efficient when compared to a typical 50/60 Hz power transformer. Because this switching mode power supply provides feedback to help control the duty cycle of the switching signal, it can provide a regulated output voltage over a wide range of input voltages and output loads. Typically the input voltage may vary anywhere from 85VAC to 260VAC at 50 Hz or 60 Hz, making them "universal" and useful anywhere in the world. This power supply can also maintain excellent efficiency and output regulation over a 20:1 load range, something not possible with a 50/60 Hz power transformer. Furthermore, because this power supply output includes an isolation transformer, the output is just as safe as a 50/60 Hz power transformer. Also, because the majority of the cost of a transformer is attributable to the iron in the core and copper in the windings, the typical switching mode power supply is more cost effective for the same output power and the cost increases more slowly with increasing power output a than with a simple transformer. The commercially available switching mode power supply model number W100-13 manufactured by Elpac® Power Systems is a representative example having an input voltage rating of 90-260VAC and a regulated output voltage of 24VDC.

Figure 3:
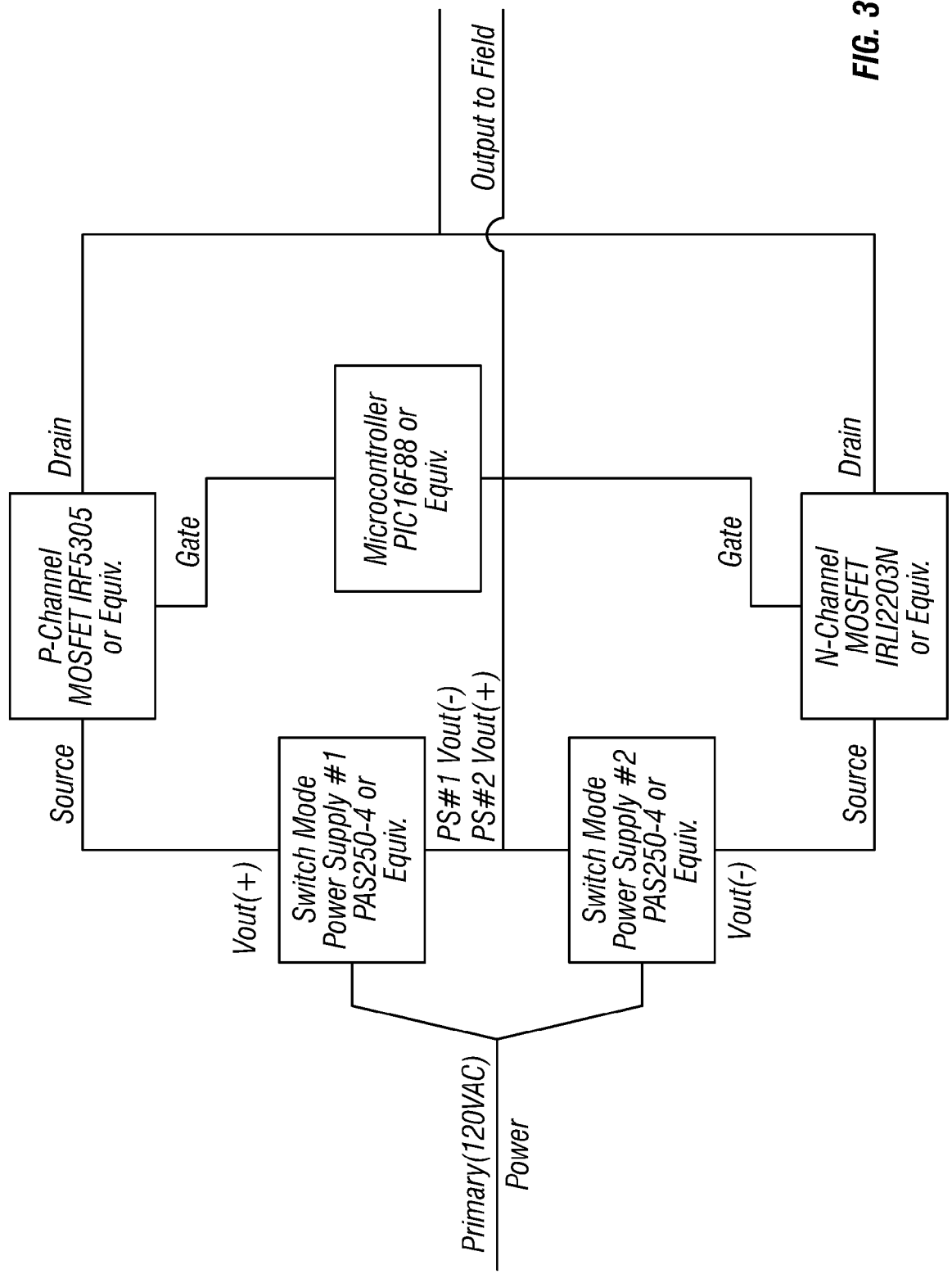
FIG. 3 is a block diagram illustrating a first embodiment of the power source and control system of the present invention.

FIG. 3 is a block diagram illustrating a first embodiment of the power source and control system of the present invention. It has the advantages of the typical switching mode AC/DC power supply without the associated disadvantages of electrolytic conductor corrosion known in the art and discussed above The first embodiment uses two DC switching mode power supplies such as those utilized in the power supply illustrated in FIG. 2, along with two Metal-Oxide-Semiconductor Field-Effect Transistor (MOSFET) switches, one N-channel, and one P-channel, and a simple microcontroller such as the PIC16F88 from Microchip Technology, to create an AC output suitable for powering outdoor lighting or any other outdoor direct burial application. The N-Channel MOSFET can be a device such as the IRLI2203N, and the P-Channel can be a device such as an IRF5305. Both devices are manufactured by International Rectifier. It should be noted that although the "classical" approach is to use complimentary (N and P) MOSFETs, 2 N-channel MOSFETs or 2 P-Channel MOSFETs can be used along with a slightly modified gate drive circuit. The power supply(s) may be a PAS250-4 manufactured by Tamura Corporation or any other suitable supply. In FIG. 3, the microcontroller controls the gate voltage of the MOS-FETs. Those skilled in the art will appreciate that discrete circuitry (not illustrated in FIG. 3) is used between the microcontroller and the MOSFETs to adjust the voltage levels.

Figure 4:
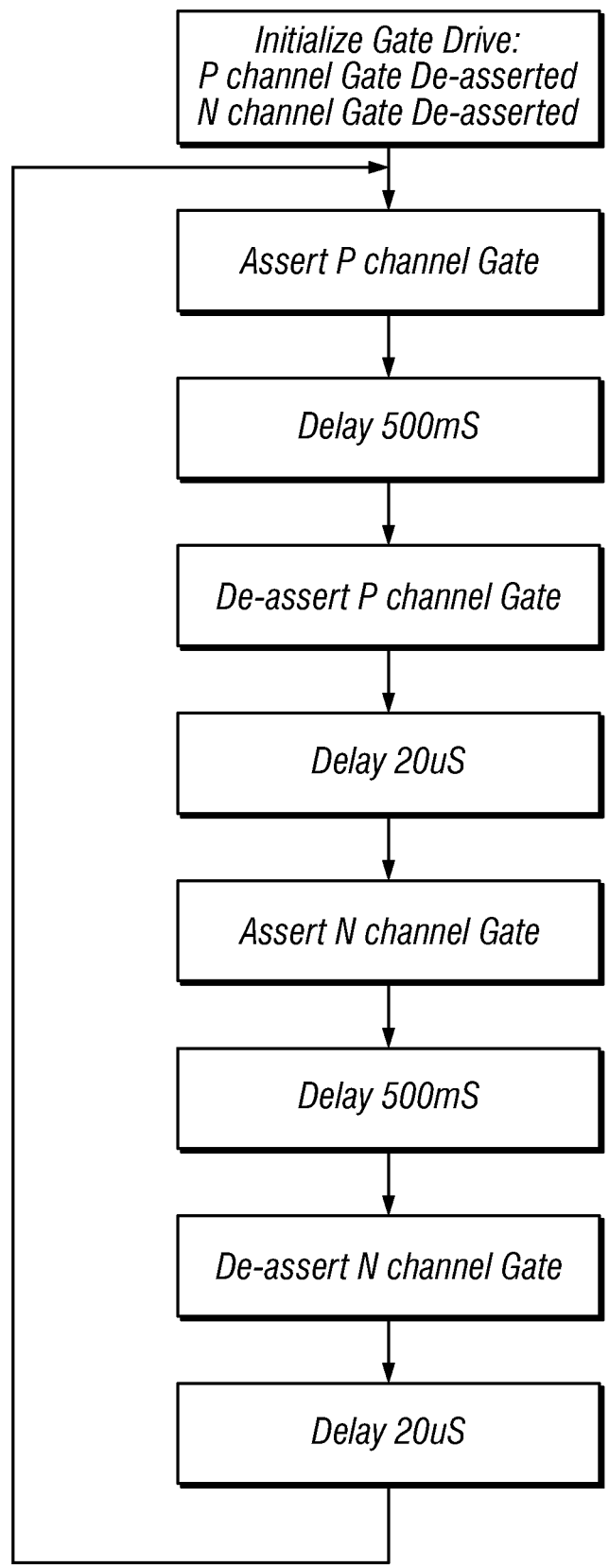
FIG. 4 is a flowchart diagram illustrating the operation of the controller timing during operation of the embodiment of FIG. 3.
Figure 5A:
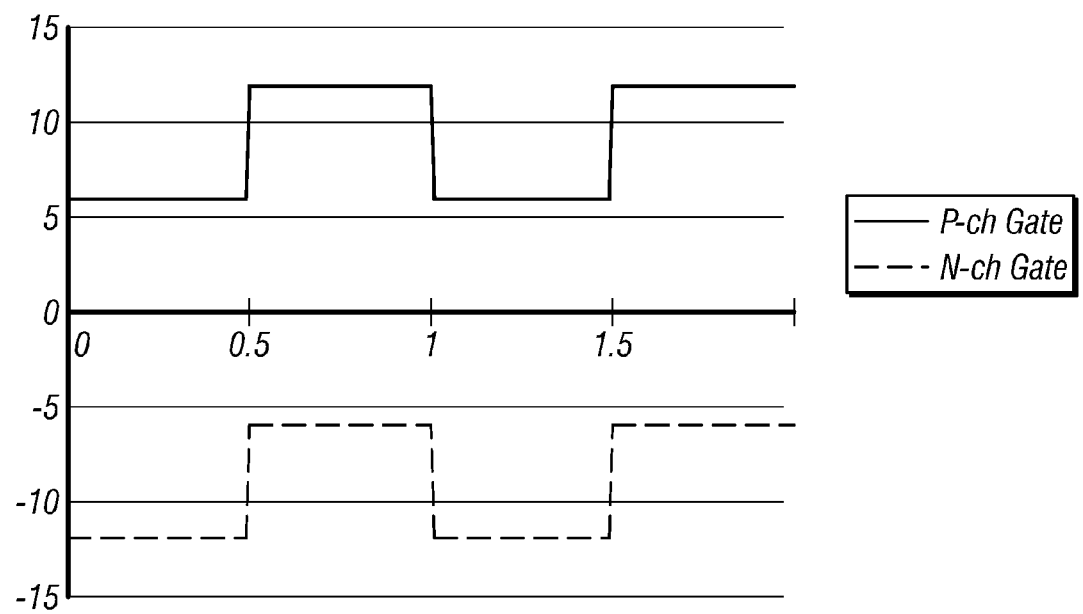
FIGS. 5A and 5B are diagrams illustrating the controller timing waveforms during operation of the embodiment of FIG. 3.
Figure 5B:
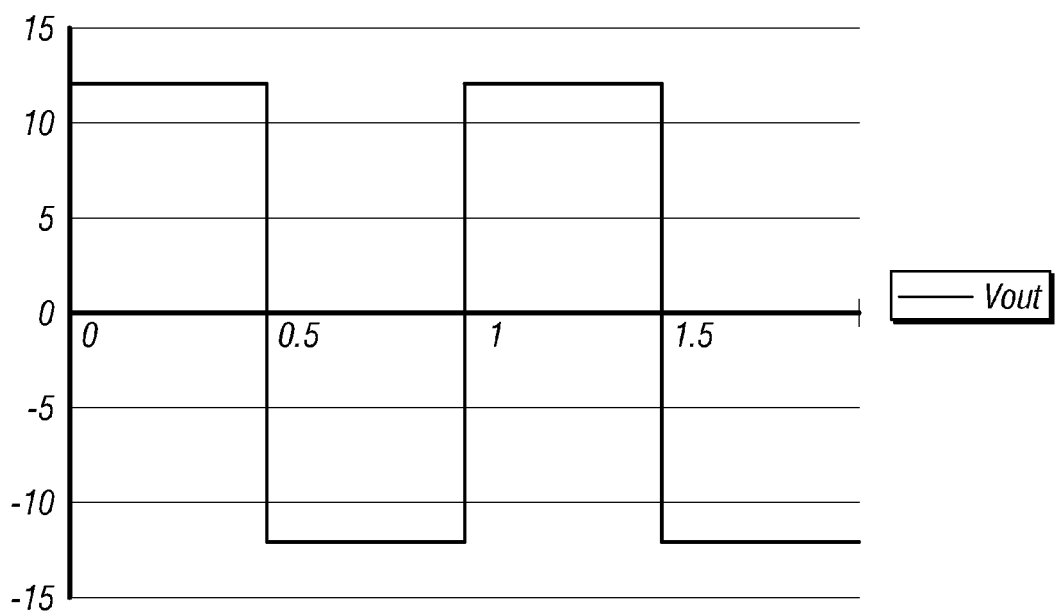

FIG. 4 is a flowchart of the controller timing and FIG. 5A and FIG. 5B provide exemplary signal waveforms produced during the operation of the power source and control system of FIG. 3. The first power supply is used to create a positive voltage with respect to the ground terminal, and the second power supply is used to create a negative voltage. In the embodiment of FIG. 3 both are 12VDC power supplies. MOSFETs Q1 and Q2 alternately turn ON to switch either the positive or negative output to the "field" wiring, i.e. the buried power cables or conductors that are connected to the lighting fixtures. As a result of this alternate switching approach, the buried conductors have no constant DC voltage on them, thus avoiding the damaging effects of electrolysis. Electrolysis can be avoided by switching the signals as slowly as once or twice per second. Because the MOSFET devices have extremely low resistances, very little energy is lost in this process.

Figure 6:
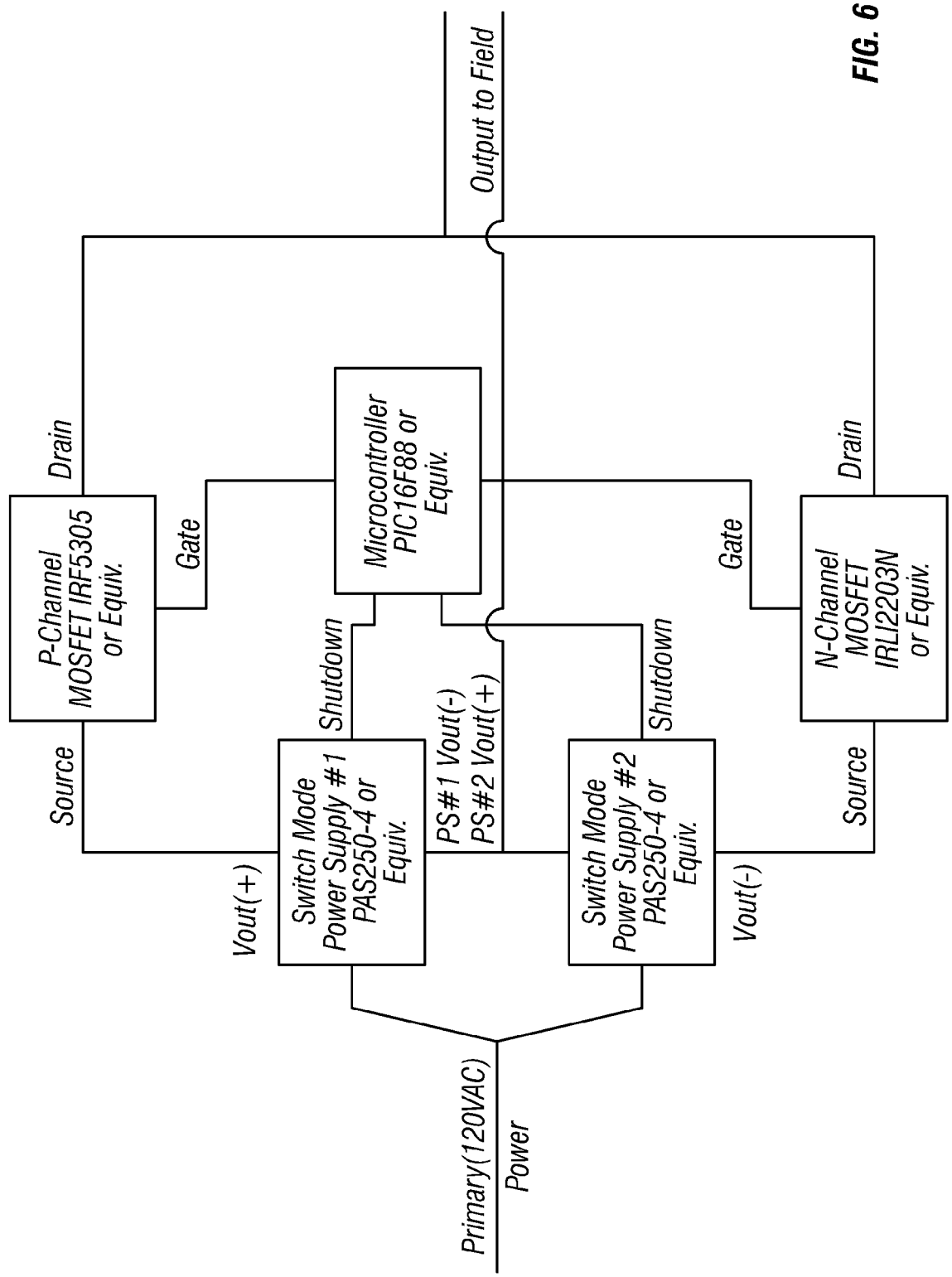
FIG. 6 is a block diagram illustrating an improvement to the embodiment of FIG. 3.

FIG. 6 illustrates an improvement to the embodiment of FIG. 3 that is even more efficient. In the improvement of FIG. 6 the AC/DC power supplies have shutdown capability. This feature can be used to allow each power supply not in use to enter a shutdown mode while the "other" supply is connected to the field wiring. Even though switching mode power supplies use far less power in the "no load" state than transformers do, this solution assures the unused supply draws little or no power during the time it is not connected to the field wiring. Start-up times for switch mode power supplies can be on the order of 100 mS, so this approach is only possible due to the relatively slow (once or twice per second) switch frequency of the MOSFET devices.

Figure 7:
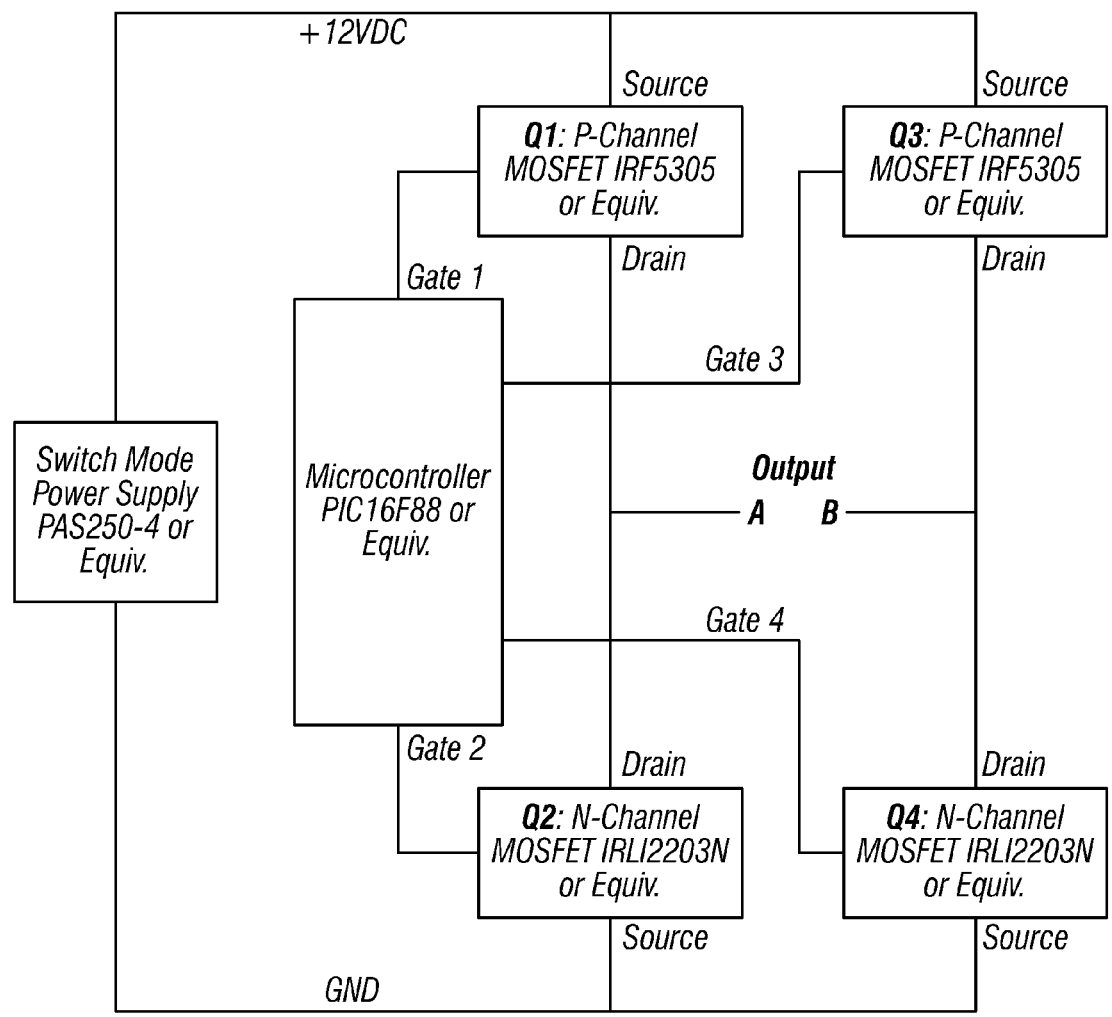
FIG. 7 is a block diagram illustrating a second embodiment of the system of the present invention.
Figure 8:
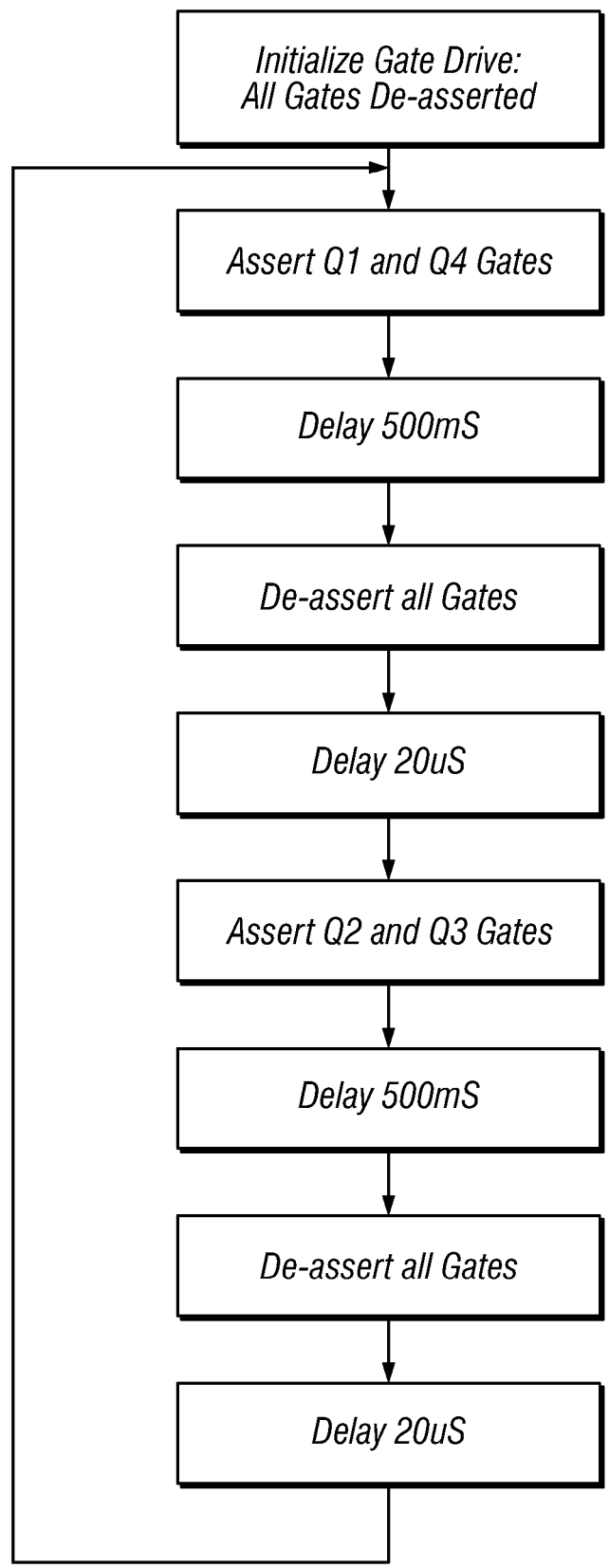
FIG. 8 is a flowchart diagram illustrating the operation of the controller timing during operation of the embodiment of FIG. 7.
Figure 9A:
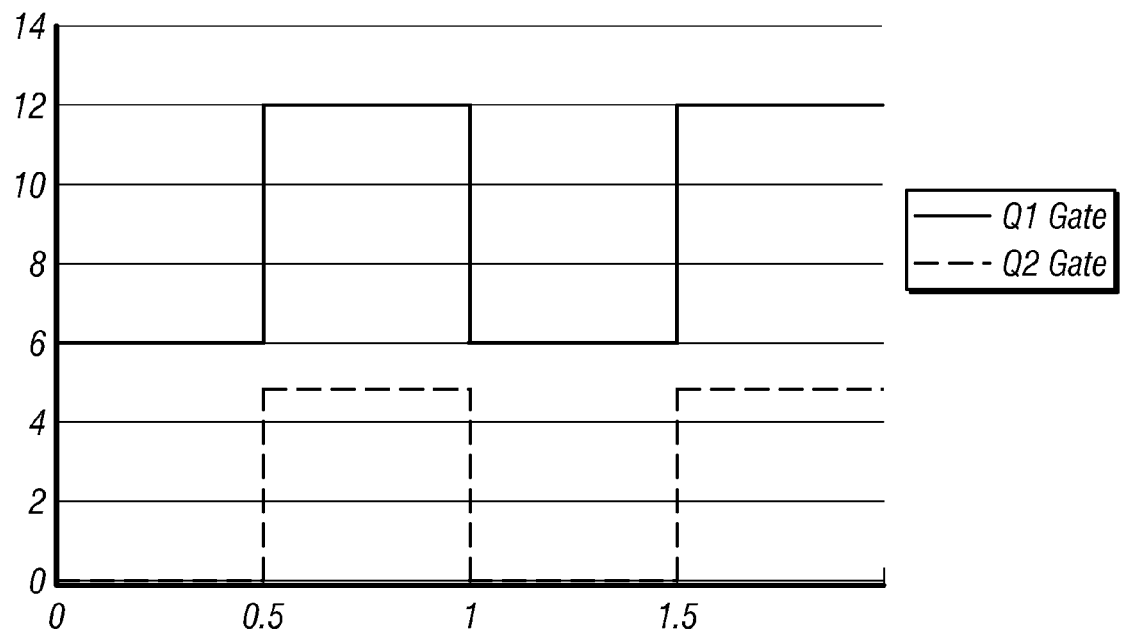
FIGS. 9A and 9B are diagrams illustrating the controller timing waveforms at the gates of the MOSFETs during operation of the embodiment of FIG. 7.
Figure 9B:
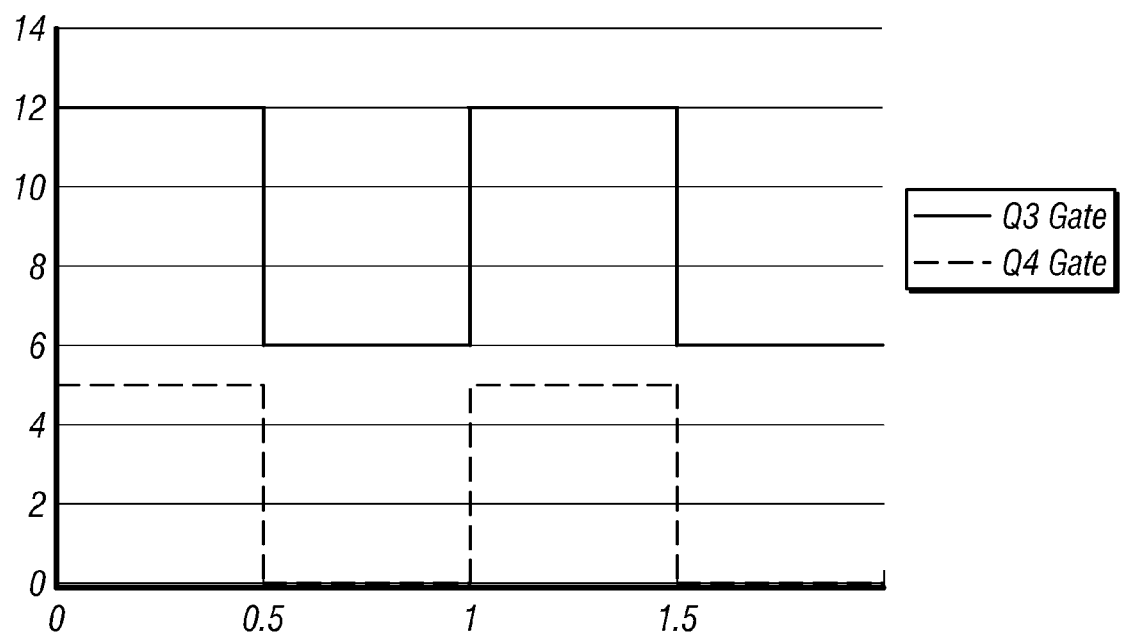
Figure 10A:
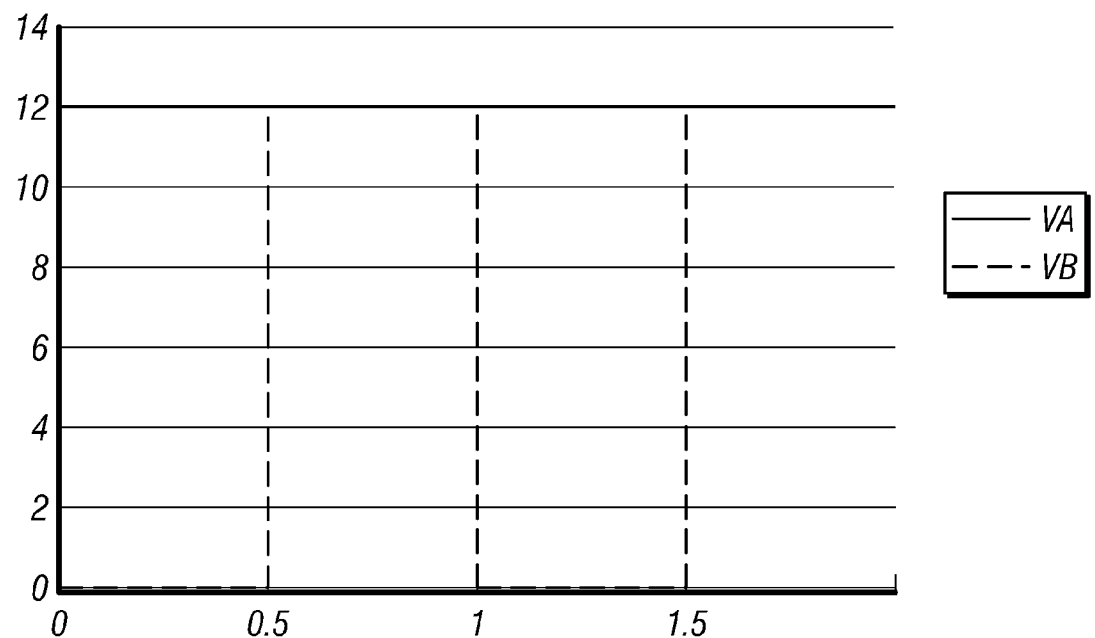
FIGS. 10A and 10B are diagrams illustrating the controller timing waveforms seen at the drains and composite outputs of the MOSFETs during operation of the system of FIG. 7.
Figure 10B:
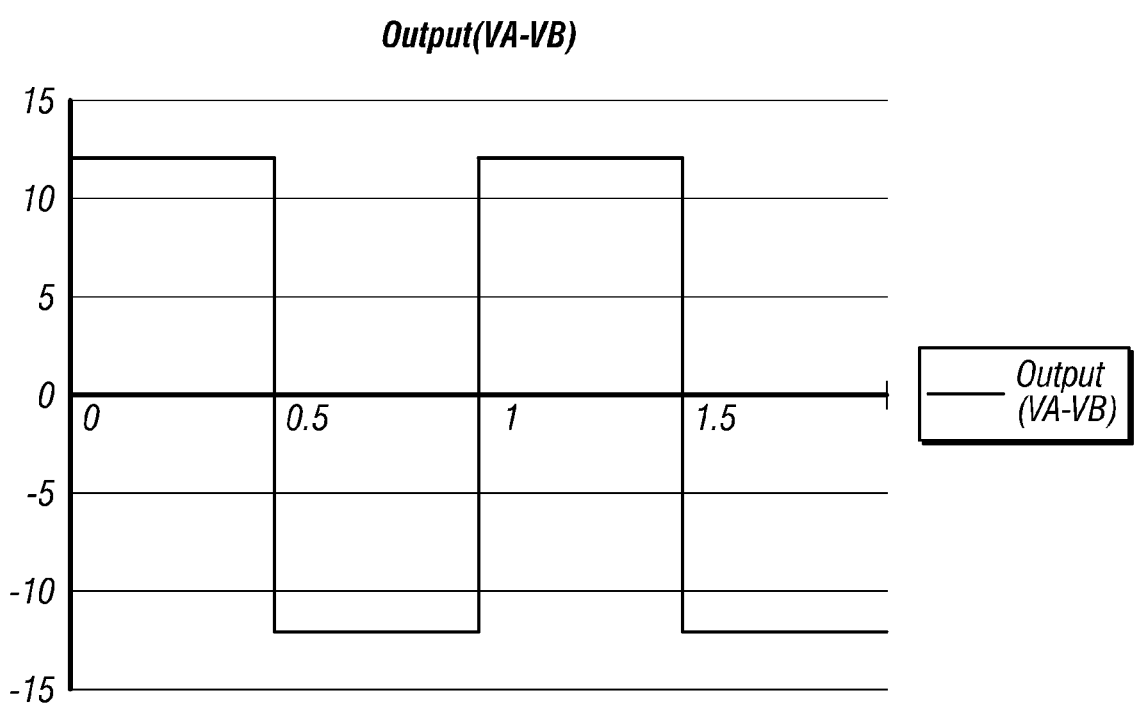

FIG. 7 is a block diagram illustrating a second embodiment of the system of the present invention. The second embodiment uses a single switch mode power supply, and what is commonly known as an H-bridge to switch opposite polarity signals to the field wiring. The H-Bridge consists of four electronic switches (MOSFETs) that allow either of the power supply leads to be connected to either of the output wires. FIG. 8 is a flowchart of the controller timing, FIG. 9A and FIG. 9B illustrate signal waveforms for the gates of the MOSFETs and FIG. 10A and FIG. 10B illustrate signal waveforms for the drains of the MOSFETs and the composite output of the embodiment of FIG. 7. The output waveform on the field wiring is identical to that of the first embodiment of FIG. 3, although the mechanism for producing that waveform is different.

The operation of the second embodiment of FIG. 7 may be better understood by considering the operation as having four distinct timing phases. During phase 1, MOSFETS Q1 and Q4 turn on. Q1 connects output wire "A" to the positive output of the power supply, and MOSFET Q4 connects output wire "B" to the negative output of the power supply. During phase 2, which is very brief, all the MOSFETs are off. During phase 3, MOSFETs Q2 and Q3 are turned on. Q2 connects output wire "A" to the negative output of the power supply, and Q3 connects output wire "B" to the positive output of the power supply. During phase 4, which is very brief, all MOSFETs are off. Phases 2 and 4 provide "guard times" required because tactual the MOSFET device switching may be slightly delayed with respect to the input switching command signals. Such a guard interval avoids damage to the MOSFETs from the high current surge that would flow through Q1/Q2 or Q3/Q4 when both transistors are conducting at the same time over this latency interval. Although MOSFETs are employed as exemplary switching devices in the specific embodiments described herein, various other similarly useful switching devices may also be advantageously used in the system of this invention, such as, for example, the Insulated Gate Bipolar Transistor (IGBT) or the Bipolar Junction Transistor (BJT).

The power source and system of this invention may be optimized for many different light sources, such as, for example, LEDs, which are available in a variety of colors, and using a combination of red, green, and blue LEDs can render almost any color imaginable. LEDs also have a fairly wide linear range and can be dimmed while still maintaining high efficiencies. This makes LED lighting particularly useful for special effect lighting such as different or changing colors or intensities. Rather than make these adjustments at the light fixture itself, it is much more convenient, and easier to review, if these changes and settings can be made at a central point, such as the power source and control system. For this to be accomplished, these settings must somehow be communicated to the light fixture, preferably over the same buried wires or conductors used for transmitting power.

Communication over the conventional 50/60 Hz 12VAC transformer output is difficult and requires additional circuitry which usually superimposes some sort of carrier onto the 12VAC signal. One such device for accomplishing this task is the PL3170 manufactured by Echelon Corporation. A Carrier Current system is also described in U.S. Pat. No. 4,583,232 assigned to General Electric Company. Data is either amplitude or frequency modulated using this carrier. Furthermore, the reception of this data requires complex filtering and additional circuitry at the light fixture. The filtering is required to remove the 12VAC signal from the carrier signal.

Figure 11:
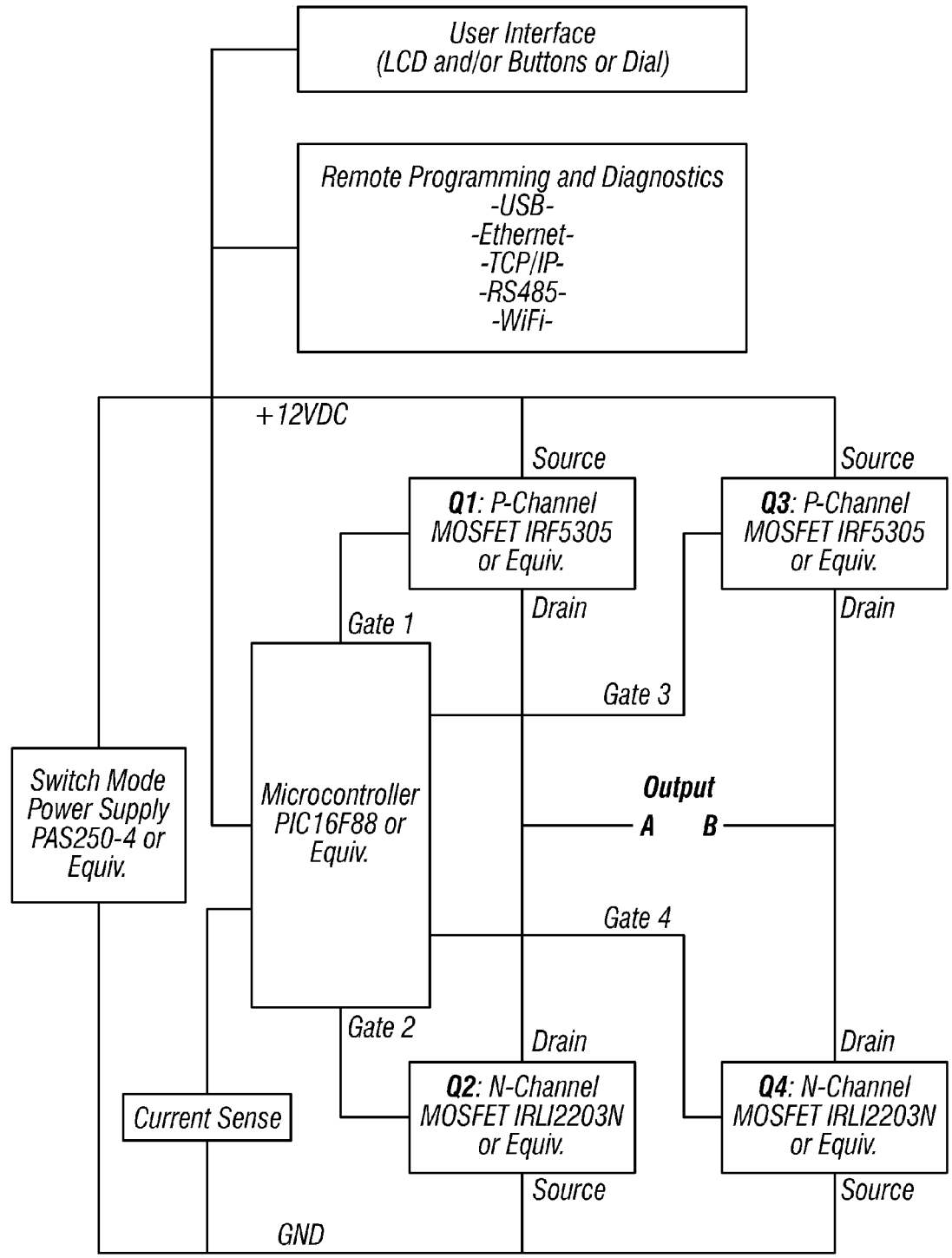
FIG. 11 is a block diagram illustrating another embodiment of the invention optimized for LED lighting applications.

FIG. 11 is a block diagram illustrating an embodiment of the power source and control system of the present invention optimized for outdoor LED lighting applications, particularly in landscape illumination applications. In addition to all the advantages already described, the embodiments of the present invention discussed above have the inherent capability to transmit data representing control signals over the field wiring by virtue of the MOSFET devices embodied therein. This can be done in several ways. For instance, the frequency with which the polarity reversal occurs can be altered to represent either a logical 1 or 0. Or, perhaps simple asynchronous serial data can be sent using the MOSFETs as drivers. Other possibilities exist. This may be accomplished because of the MOSFET switches afford the power source and control system of the present invention with a large degree of control over the characteristics of the signal used to power the lighting fixtures. The MOSFET switches can be used to determine the signal's polarity, timing, and frequency. They can be used to encode data on the power lines without the need for a carrier signal. This is a significant and unexpected advantage over the 120VAC/12VAC transformer known in the art, which affords no way to vary the frequency of the output or modulate its polarity so that additional circuitry must be provided to produce and receive some other "communications" signal or carrier on top of the intact 12VAC power signal. Also, because the MOSFETs can momentarily all turn off, it is also possible to create brief moments in time when the lighting fixtures themselves can drive the line (using stored energy), thereby facilitating bi-directional communications without additional signals or components. Such periods of time, for example, may be so brief as to produce no visible change at the lighting fixtures themselves.

The embodiment of FIG. 11 may be implemented utilizing the dual power supply approach of the embodiment of FIG. 7 for example. The above discussion describes how the H-Bridge circuitry can be used to communicate over the buried conductors to an intelligent LED-based lighting fixture.

The embodiment of FIG. 11 adds the capability to program the power source by means of, for example, a local user interface, which may or may not be permanently installed in the power source apparatus, for example. Also illustrated in FIG. 11 is a way to program the power source remotely via a standard communication protocol such as USB, Ethernet, WiFi, TCP/IP, RS485, RS232, etc. Depending on the method used, the device doing the programming could be anything from a PC to an internet enabled phone. The programming information may be immediate (manual) commands such as turn ON now with an intensity of 75%, or it may be a schedule whereby the lights are instructed to turn ON at different intensities, at different times of the day and days of the week. Of course, it will be understood that zero intensity is functionally the equivalent of an OFF state of a lighting fixture. Although not illustrated, the power source and control system of FIG. 11 could also have an ambient light sensor so that the schedule could be based on ambient light such as "turn ON for 4 hours starting at dusk." The embodiment of FIG. 11 also contains a current sensing block. The power source and control system has enough "intelligence" to know what the expected current flow should be based on the ON/OFF and intensity commands it has sent out. If a current much different than what was expected is measured, the user is alerted via the user interface, or the remote programming connection. The system could send a text message or e-mail to the user warning of a problem indicated by excess current flow.

Figure 12:
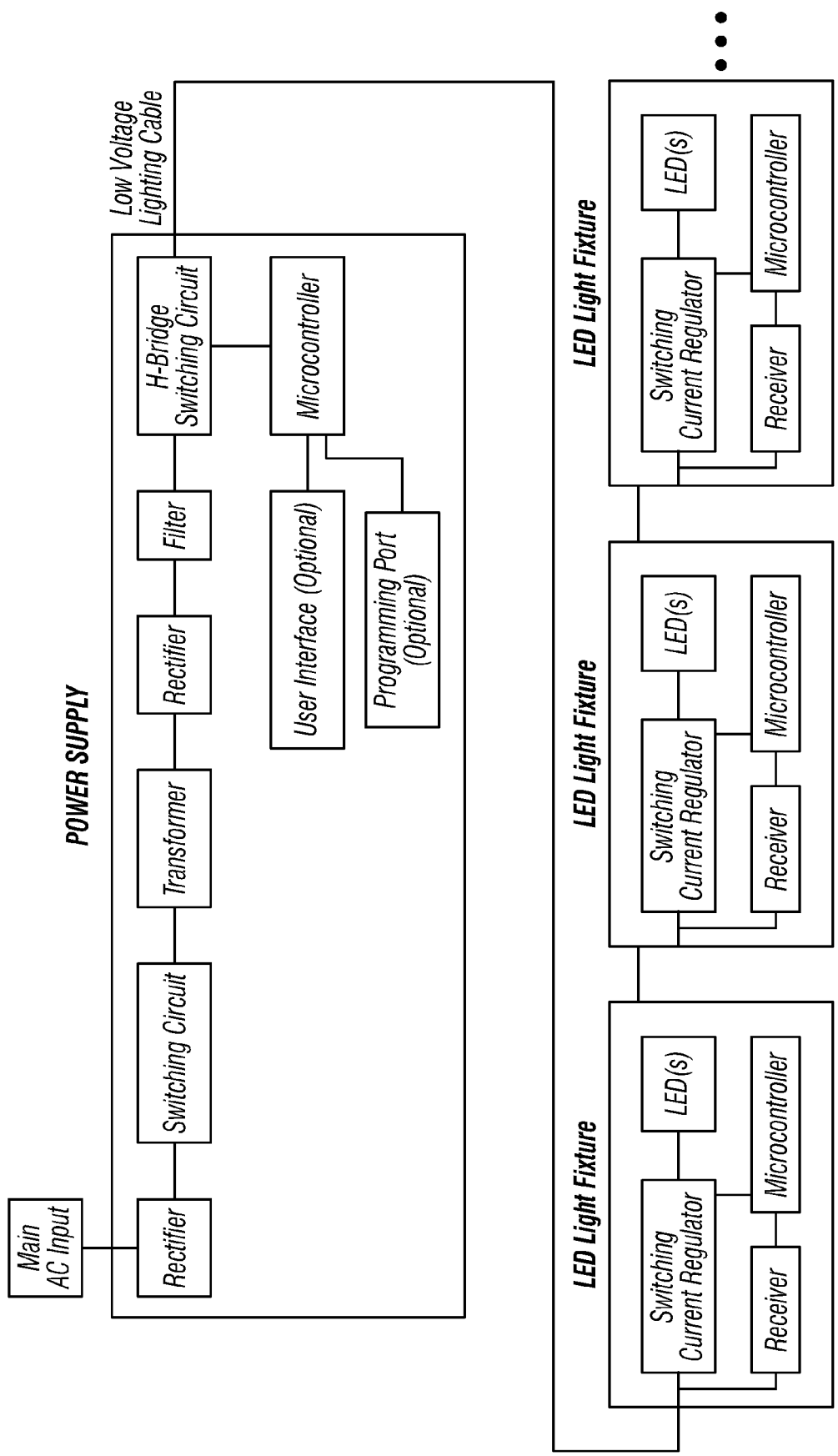
FIG. 12 is a block diagram illustrating an embodiment of a programmable outdoor lighting system combining the power source and control system of the present invention with an intelligent lighting fixture.

FIG. 12 is a block diagram illustrating an embodiment of a programmable outdoor lighting system combining the power source and control system of the present invention with an intelligent light fixture. The communications from the power source and control systems to either the user interface or a remote programming device via the programming port can be two-way so that verification of program acceptance can be achieved. The two-way feature also allows for diagnostic capability.

Thus, the present invention provides an AC/DC switching power supply whose output is fed into an H-Bridge for the purpose of slowly flipping the polarity of the signal to the two-wire path that can energize a plurality of landscape lighting fixtures. The capability to flip polarity can be used to communicate (i.e., send commands) to selected lighting fixtures via the same two wires that supply power. These commands or control signals can be used to turn individual lights ON and OFF, control their brightness, or control their color. This can be done by quickly flipping the polarity to create an asynchronous communications signal similar to RS232, but with higher drive capability. As mentioned, the individual landscape lights in the field need to be provided with special circuitry to receive this communications signal, and use the information to control some aspect of the light. This circuitry is typically called a "decoder" since it decodes the information on the power line.

Figure 13:
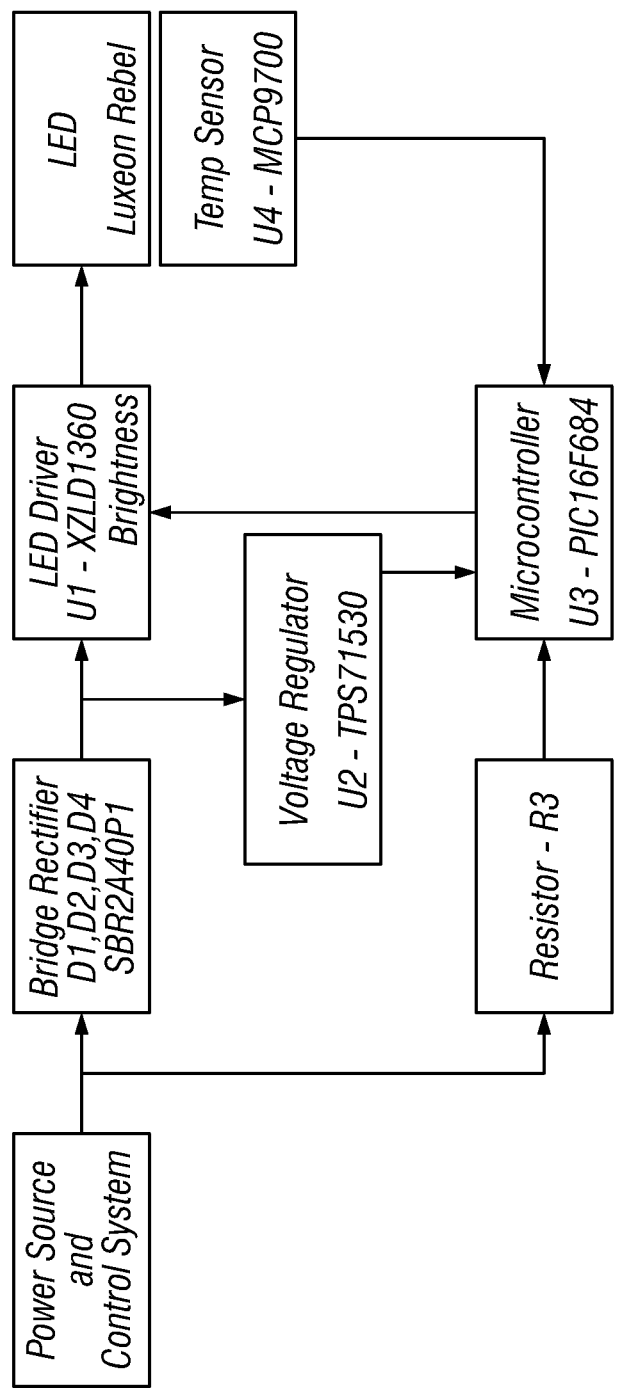
FIG. 13 is a block diagram of a decoder circuit in accordance with an embodiment of the present invention.

A block diagram of a single channel landscape light with a decoder circuit is illustrated in FIG. 13. A schematic diagram of the single channel decoder circuit is illustrated in FIG. 14. In this embodiment the landscape lighting fixture is an LED-based lighting fixture, although it could also have been an incandescent or florescent bulb lighting fixture.

Figure 14A:
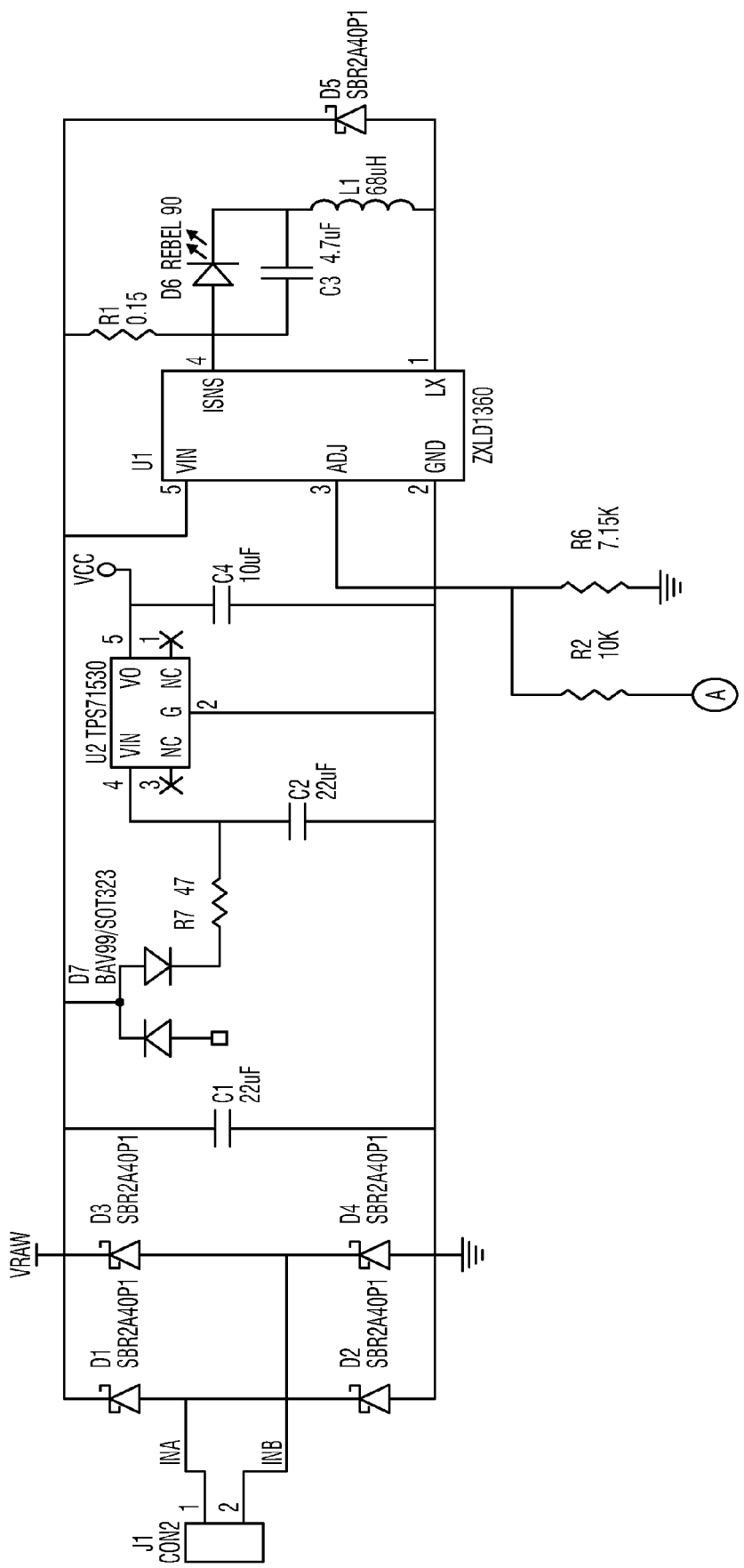
FIGS. 14A and 14B are separate portions of a schematic diagram of the decoder circuit of FIG. 13, and the lines labeled with the letter A inside of an oval in FIGS. 14A and 14B connect with one another.
Figure 14B:
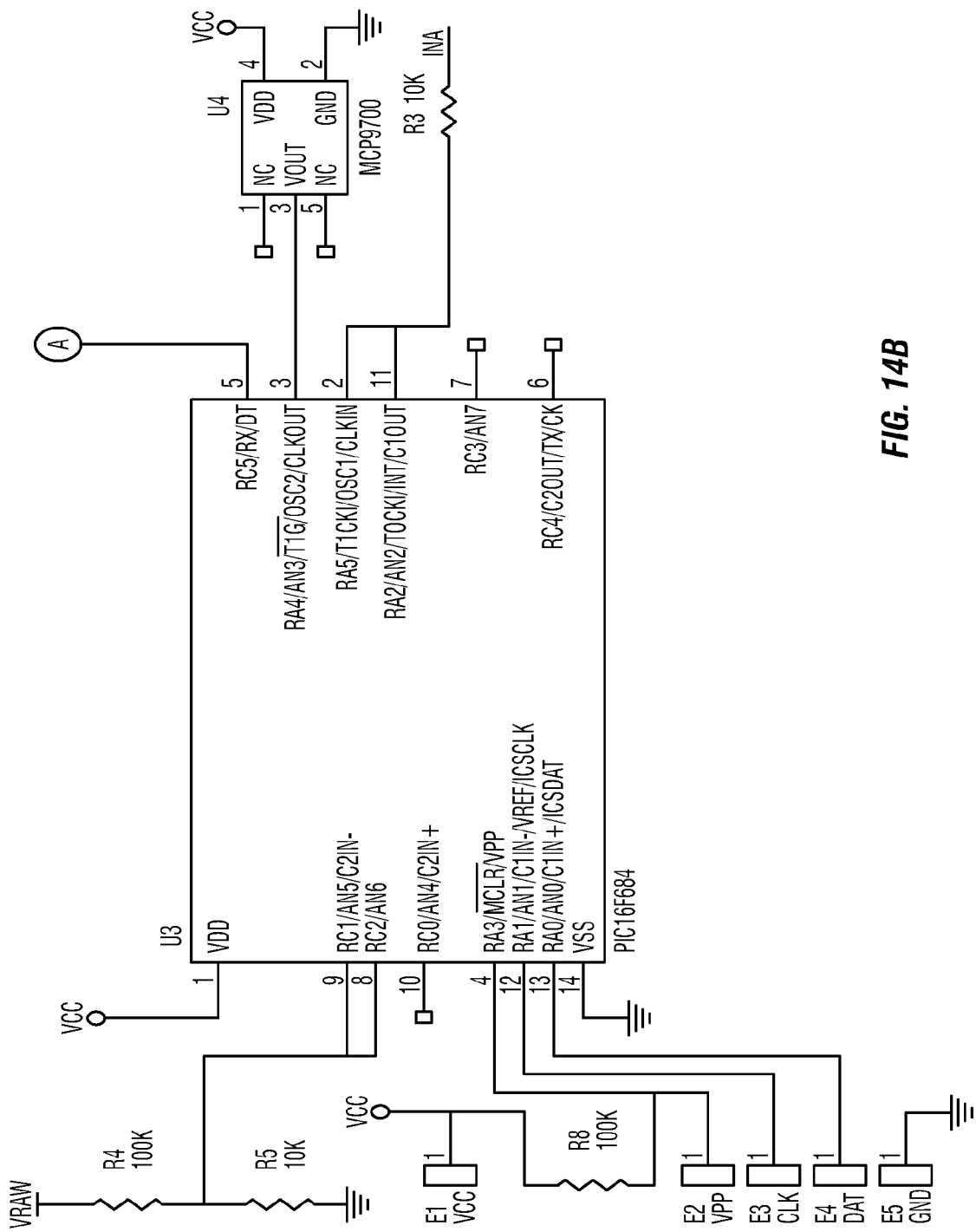

Referring to FIG. 13 and FIGS. 14A and 14B, the signal from the power source and control system is first fed into a bridge rectifier comprised of diodes D1, D2, D3 and D4. These may be PN SBR2A40P1 Schottkey rectifiers available from Diodes, Inc., or other suitable components. This bridge rectifier converts an input signal of any polarity into a know polarity DC signal to power the other circuits on the lighting printed circuit board. This DC signal is fed into LED Driver IC, U1 which is a ZXLD1360 available from Zetex Semiconductor, or equivalent. This driver IC uses an efficient Buck switching topology to generate a regulated output current which is used to power high-power LED, D6, which is a Luxeon Rebel LED available from Phillips. The power supply and control system is preferably incorporated in a landscape lighting controller comprising including a plastic housing with a face panel having manual user inputs and a graphical user interface (GUI).

The DC voltage output from the bridge rectifier is also used to create a regulated logic supply voltage. In this case, this is done by 3-Volt regulator U2, a TPS71530 available from Texas Instruments. This IC supplies power to microcontroller U3, a PIC16F684 available from Microchip Technology. The microcontroller and firmware that resides inside the microcontroller U3, comprise the receiver for the data being sent from the power source and control system. Resistor R3 couples data from the power source and control system to the microcontroller while simultaneously limiting current into the microcontroller. The microcontroller then generates a signal which is coupled to the LED driver IC. This signal is used to vary the intensity of the light based on data received from the power supply. Typically, part of the data received is an address that is used to determine if the information being sent is intended for this lighting fixture (each lighting fixture will have a unique address). It is also possible for certain commands to be intended for lighting fixture "groups." A group may be defined as a certain type of lighting fixture, for instance, a path light. Or, a group may be all lighting fixtures in a certain location, e.g. a patio. Yet other commands may be intended for all lighting fixtures. Therefore, using this addressing technique, commands set up by the user on the landscape lighting controller and encoded on the multi-wire path by its processor may affect an individual lighting fixture, a group of lighting fixtures, or all lighting fixtures. It is also feasible for the power source and control system to communicate an intensity pattern to one or more lighting fixtures. This can be a pre-orchestrated pattern of varying intensities. It is possible for this pattern to be "canned" or preset inside the lighting fixture, or for the details of the intensity pattern to be communicated from the power source and control system. This feature may be useful for lighting "effects" which may be synchronized to music.

Another task of the microcontroller is to protect the lighting fixtures from overheating. In general, high-power LEDs generate significant heat. A temperature sensor can be mounted on the printed circuit board that supports the LEDs. The temperature sensor may be an MCP9700 available from Microchip Technology. The temperature sensor's output is an analog voltage which is read by an A/D converter in the microcontroller. The microcontroller uses this information to "throttle back", i.e. decrease, the power to the LEDs when the temperature rises above a predetermined maximum temperature. Typically, that temperature is chosen to keep the internal junction temperature of the LEDs within their rated specification. The throttling is achieved the same way the intensity variation is achieved. Although this embodiment of FIG. 13 and FIGS. 14A and 14B illustrates only a single LED, it will be apparent to those skilled in the art that the same driver, or a similar driver, could be used to drive almost any number of LEDs. Typically a lighting fixture used in landscape lighting applications will have multiple LEDs mounted on a printed circuit boards supported inside a decorative outer metal housing behind a suitable lens or window.

Figure 15:
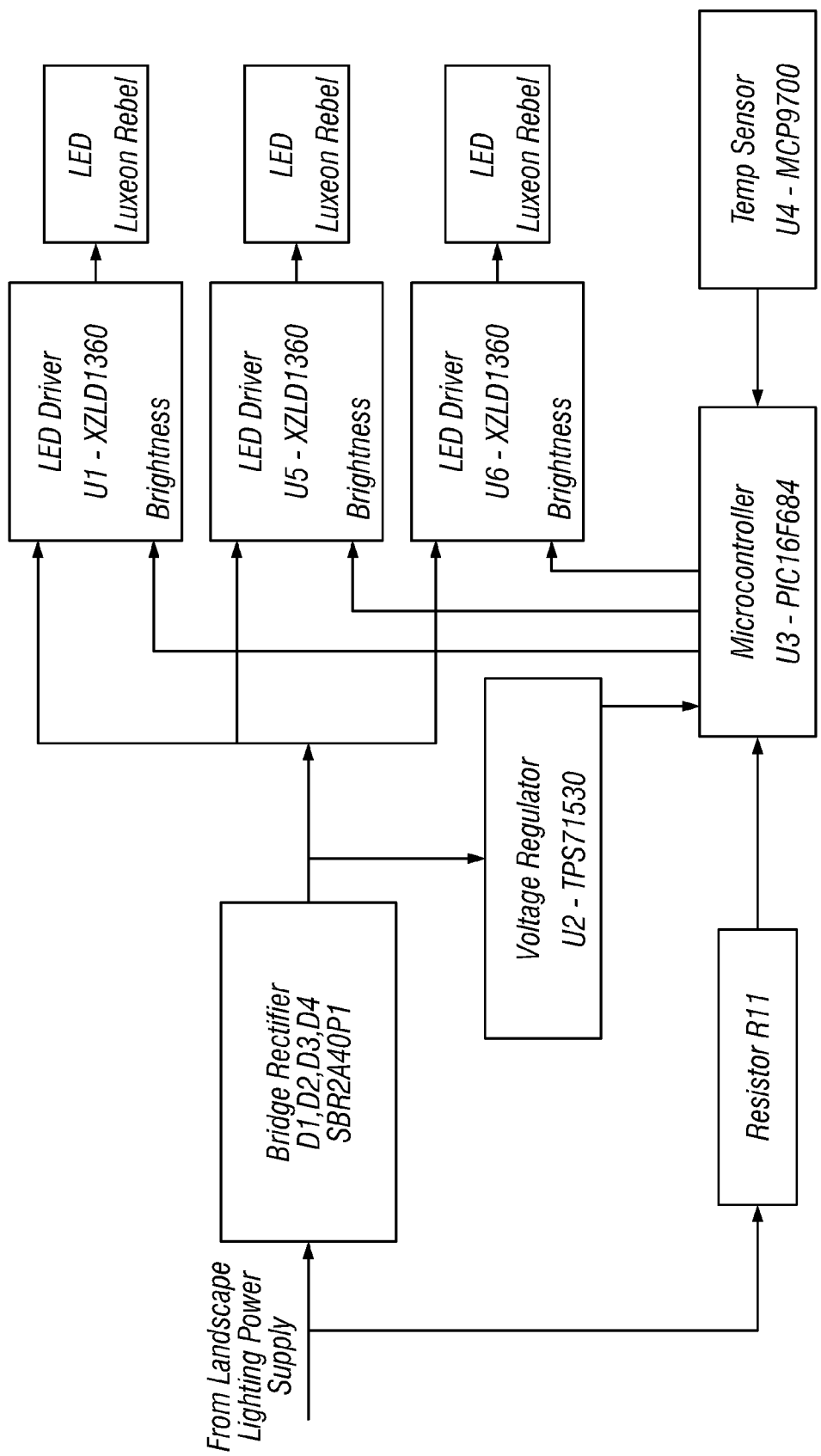
FIG. 15 is a block diagram of a three channel decoder circuit.
Figure 16A:
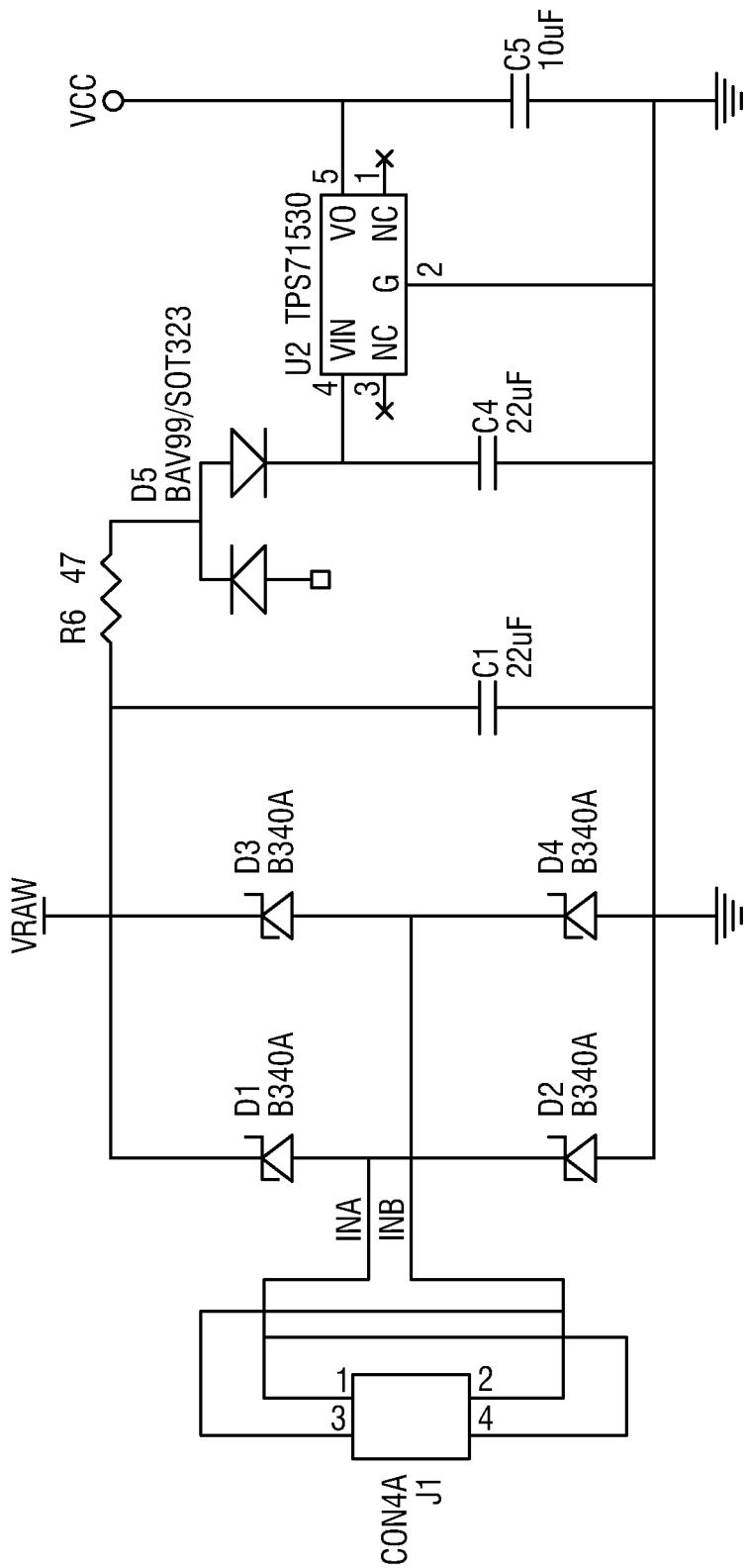
FIGS. 16A-16E are separate portions of a schematic diagram of the three channel decoder circuit of FIG. 15, and the lines with the circled letters A-F connect with similarly labeled lines in FIGS. 16B-16E.
Figure 16B:
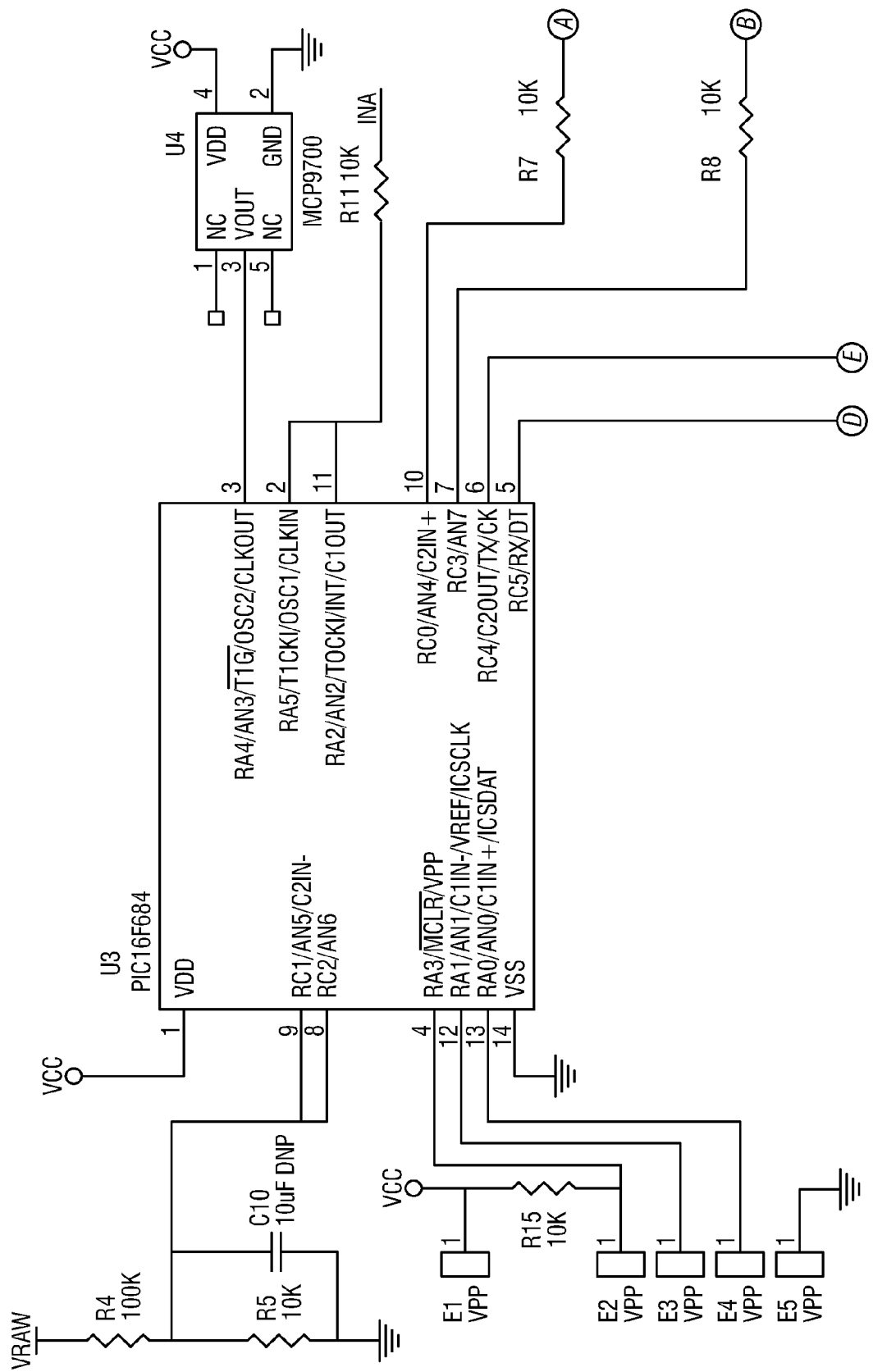
Figure 16C:
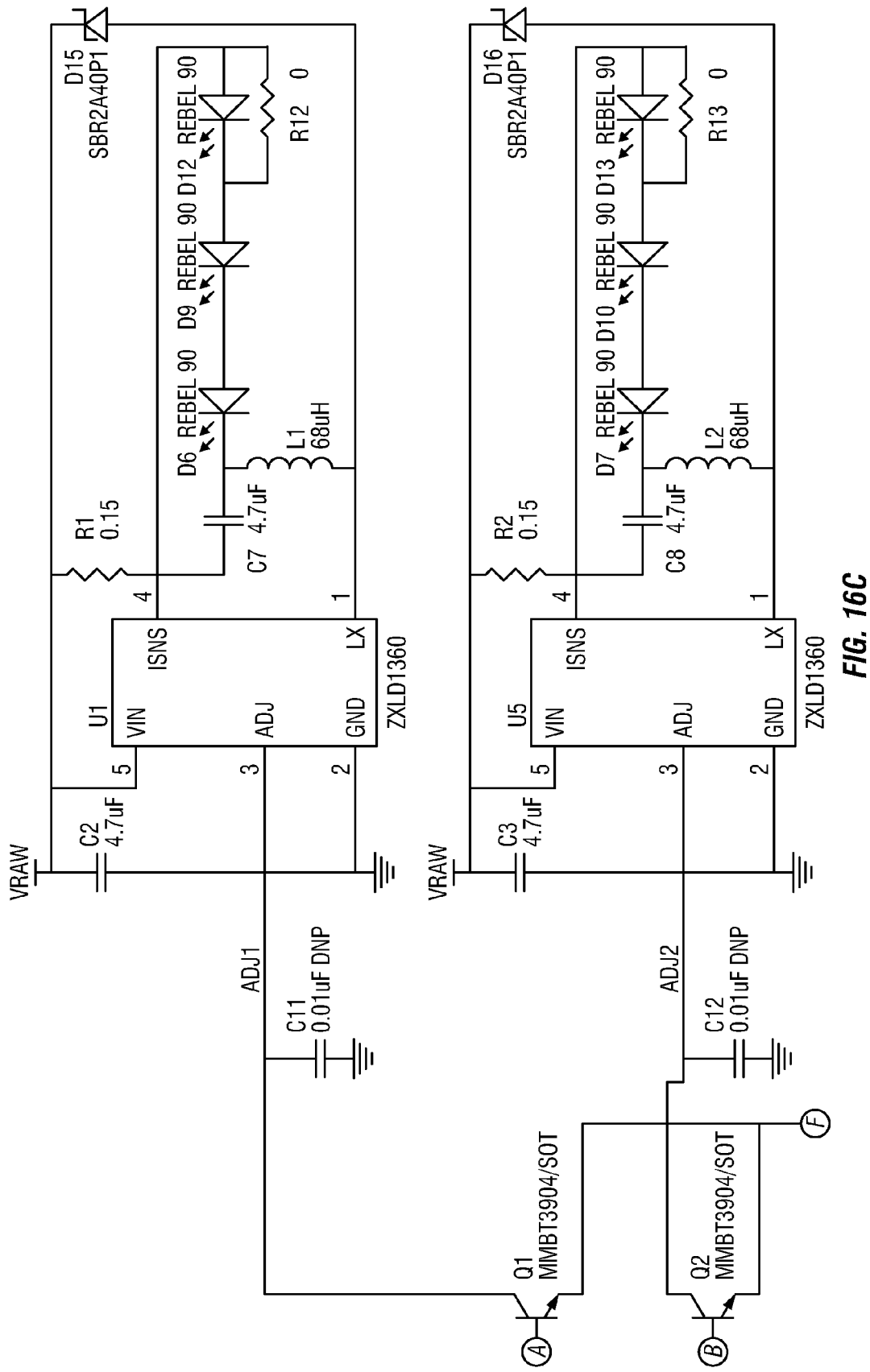
Figure 16D:
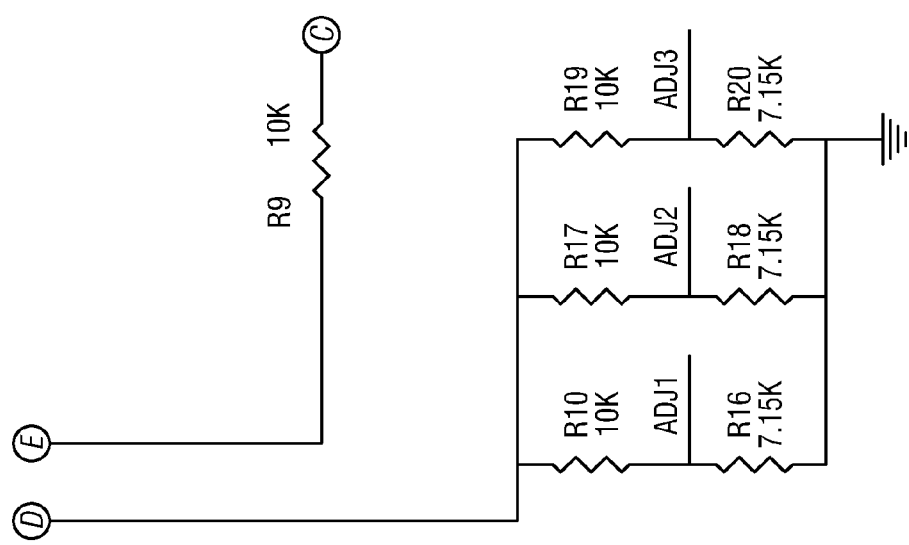
Figure 16E:
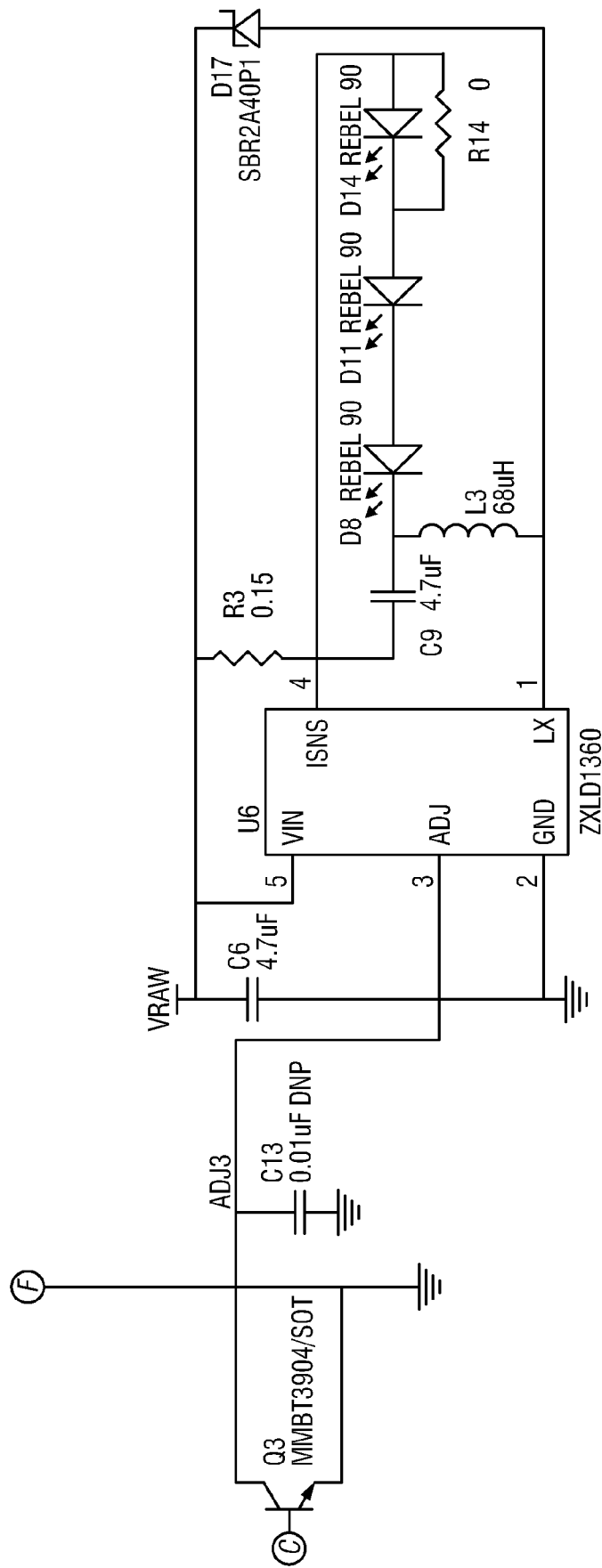

A block diagram of a three channel landscape lighting fixture with a decoder circuit is illustrated in FIG. 15 and a schematic diagram of the three channel decoder circuit is illustrated in FIGS. 16A-16E. The three channel decoder circuit essentially triples the circuitry of the single channel decoder circuit with respect to the LEDs and drivers. The three channel decoder circuit still requires only one bridge rectifier circuit, and one microcontroller. Diodes D1 through D4, U1, U2, U3, and U4 all serve the same purpose as they do in the single channel decoder circuit. U5 and U6 are new to the three channel embodiment. They are identical to U1. In conjunction with the microcontroller, U1, U5, and U6 allow independent brightness control to three separate 3-LED strings. Clearly, this approach could be used to add more channels, or to change the number of LEDs in each string.

Like the single channel decoder circuit the three channel decoder circuit uses the microcontroller, U3, to receive information from the landscape lighting power supply and vary the LED intensity based on this information. Since each of the three channels can be independently controlled, the commands to a three channel decoder must contain intensity level information for each of the three channels.

One of the primary advantages to the multi-channel decoder circuit of FIG. 15 and FIGS. 16A-16E is that fact that each channel may consist of a different color LED. For instance, if one of the channels is red, one is green and the third is blue, then any color, such as orange, can be generated by mixing the intensities in the correct ratios. This not only allows the user to formulate any color of light that is desired, but also to vary that color, either abruptly, or by a gradual blending technique. Outdoor lights could also be modified to match a particular season or holiday. For instance, red, white, and blue colored lights could be use on the $4^{th}$ of July, red and green lights could be used around Christmas, and orange lights could be used for Halloween and Thanksgiving.

There is another possible use for the three channel decoder circuit of FIG. 15 and FIGS. 16A-16E. The user may be a "purest" who prefers white lights. The term "white" encompasses a wide range of shades from the more "blue" cool whites, to the more "yellow" warm whites. White LEDs by their nature are cool white. This is because a white LED is actually a blue LED with phosphor coating that glows white. For most people this is acceptable, but for some, a warmer white may be desired. If one of the three channels is populated with a red or yellow LED, then by varying the intensity of that channel, one can vary the warmth, or "color temperature" of the lighting fixture. This is also important because different color temperatures are better at illuminating certain subject hues than others.

It will be apparent to those skilled in the art that control of individual lights or individual channels of LEDs within a single lighting fixture is advantageous. Even more advantageous is to be able to achieve this control using the same set of wires that deliver power to the lighting fixture. Lastly, integrating all of the decoder circuitry, the driver circuitry, and the temperature throttling on a single printed circuit board within the light fixture itself, results in a highly integrated, self-contained intelligent light fixture which is no harder to install than a traditional landscape lighting fixture.

Figure 17:
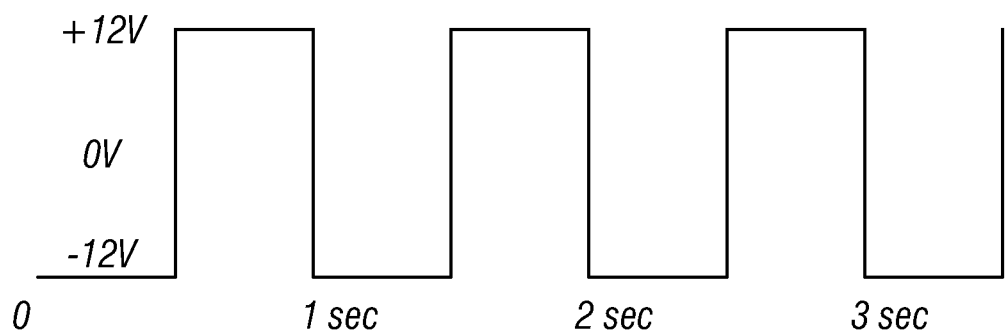
FIG. 17 is a diagrammatic illustration of the manner in which an H-bridge switches a twelve volt signal across a two wire path.

As illustrated in FIG. 17, the H-Bridge is used to alternately apply a +12V and −12V signal across the two-wire low voltage path. This signal alternates polarity at a fairly low frequency (e.g. between about AC voltage is switched at a frequency of between about 0.5 Hz and about 10 Hz, and more preferably at about 1 Hz) in order to reduce electromagnetic emissions which inherently exist at each rising and falling edge. Such emissions can interfere with various wireless communications and may be subject to FCC limitations. The relatively low frequency at which the AC signal transmitted to the lighting fixtures also reduces the amount of time that the switching devices in the H-bridge spend between ON and OFF states. During this time, the switching devices enter what is known as a "linear" region where they dissipate more power. This results in lower efficiency and greater heat being generated in the switching devices. Switching the AC signal at a relatively low frequency thus results in less power dissipation that switching at a higher frequency, e.g. 60 Hz.

Figure 18:
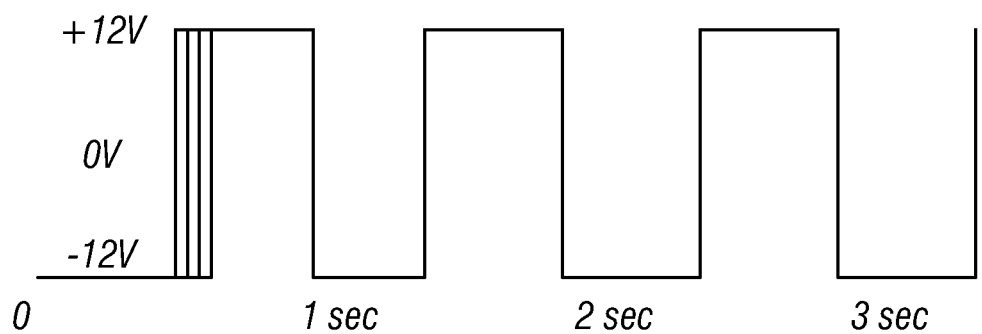
FIG. 18 is a diagrammatic illustration of the manner in which the power source and control system of the present invention can encode data comprising a control signal, the control signal being encoded immediately after the rising edge of the AC power signal illustrated in FIG. 17.

When the power source and control system communicates with the lighting fixtures, the microcontroller in the power source utilizes the H-bridge to encode the data to be communicated on the two-wire path by rapidly switching the states of the line. This can happen at any time, but it is often advantageous to synchronize this data to a specific edge of the power signal so that the lighting fixture knows approximately when to look for data representing control signals, and when to ignore transitions which may represent noise on the line. The same signal with data encoded may look like the signal illustrated in FIG. 18 where the encoded data is illustrated diagrammatically after the first rising edge. Thus the AC signal carried on the two wire path to the lighting fixtures is switched at a relatively low frequency to avoid galvanic corrosion but can also be periodically switched at a much higher frequency (e.g. between about 100 Hz and about 5 KHz, and more preferably at about 1 KHz) in order to efficiently send an encoded control signal to the plurality of lighting fixtures.

Figure 19:
FIG. 19 is a diagrammatic illustration of a Manchester encoded one and zero.

Many different types of encoding can be used, but one of the most advantageous encoding schemes for a landscape lighting system is Manchester encoded data. Manchester data has the benefit of always having zero DC content regardless of the ratio of ones to zero's transmitted. This simplifies detection of the signal since the in-coming signal can be compared to a 0V signal to determine whether it is HI or LO. It also assures that the two-wire path has zero average DC voltage on it which is important to avoid galvanic corrosion as discussed earlier. Generally speaking, a Manchester encoded signal represents a logic ZERO by a LO followed by a HI. A logic ONE is represented as a HI followed by a LO. This is illustrated in FIG. 19. It should be noted that in the literary references the definition of a Manchester ONE and a Manchester ZERO may be reversed, but in either case, the key is that there is a zero average DC level when using this method.

In order for the power source and control system of the present invention to encode a message onto the two-wire path, a protocol must exist that describes how to combine ones 1's and 0's in a meaningful way to convey a piece of information. The explanation below is just one example of a protocol. Many others may be developed to accomplish the same task.

Let the Manchester bit period for the Protocol be 2 mS. The pertinent information to convey for a lighting application would be which lighting fixture or group of lighting fixtures the message is intended for, and the brightness level of those lights. Thus at a minimum the protocol should include a field identifying a destination and a field identifying a predetermined intensity. If a single fixture has a red, green, and blue bulb or LED, this approach could even be used to create a custom color if each of the red, green and blue LED's had its own "address" and could be communicated to independently even though they are in one fixture. For the purpose of this protocol the following abbreviations will be utilized:

ST=Start Bit=a Logical 1 indicating the start of data

LG=Lighting Group Bit. A Lighting Group is a group of lighting fixtures that may be communicated to by a single message, wherein that message contains a Group Number that matches the number of the Lighting Group. It may be advantageous to assign all the lighting fixtures in a certain part of a yard to a single Lighting Group so that they can be controlled together. If this bit is set in the data stream, then the information is intended for a specific Lighting Group.

LF=Lighting Fixture Bit. If this bit is set in the data stream, then the information is intended for a specific Lighting Fixture.

AF=All Fixtures. If this bit is set in the data stream, then the information is intended for all Lighting Fixtures.

N=Lighting Group, or Lighting Fixture Number=A number or address to differentiate a single Lighting Group from all other Groups, or a single Lighting Fixture from all other Fixtures. This number can be 13 bits long, thus up to 8192 individual lights or groups may be communicated to. The value of this number is ignored if the AF bit is set.

IL=Intensity Level=a number that represents the intensity of the light. This number is 8 bits long, and may range from 0 to 200. This represents an intensity granularity (or step size) of 0.5%. IL numbers from 201 to 255 are reserved for future use and may instruct the light, or group of lights, to begin pre-defined "lighting effects".

CS=Checksum=This is an eight bit number that represents the lower 8 bits of the sum of the 3 bytes of data in the message. The first byte being the upper 5 bits of the Group or Fixture Number "N" combined with the LG, LF, AF bits. The second byte is the lower 8 bits of the Group or Fixture Number. The third byte is the Intensity Level, IL.

SP=Stop Bit=a Logical 0 indicating the end of data

Using the above definitions, a complete message, defined by this protocol, is illustrated in FIG. 20. All bytes are sent MSB first. Including start and stop bits, the entire message is 34 bits long. Since each bit takes 2 mS, the entire message takes approximately 64 mS to send.

FIG. 21 illustrates a first sample message that instructs Lighting Group 1 to turn on at 50% brightness (IL=100).

FIG. 22 illustrates a second a sample message that instructs Lighting Fixture 8 to turn on at 100% brightness (IL=200).

To recapitulate, in accordance with an embodiment of the present invention the power source and control system receives line voltage AC that is rectified into a first high DC voltage. This first DC voltage is switched by a first switching circuit to create a high frequency AC voltage. The high frequency AC voltage is coupled through a transformer for isolation and step-down purposes. Because the frequency is high, the transformer is small and light compared to a 50/60 Hz transformer. The output of the transformer is rectified and filtered to produce a low voltage (12V) DC signal. The 12VDC signal is fed into a second switching circuit in the form of an H-bridge circuit that generates a low frequency AC signal with data periodically encoded at a high frequency. The low frequency AC signal is transmitted to the lighting fixtures via the buried power conductors. The encoded data represents a control signal that can be decoded by the lighting fixtures to adjust the intensity of pre-selected ones of the lighting fixtures.

Clearly, other embodiments and modifications of this invention may occur readily to those skilled in the art in view of these teachings. The power source and control system of the present invention can be used in a landscape lighting system employing various types of illuminators, e.g. incandescent lights, light emitting diodes (LEDs), and Variable-Color Light-Emitting Devices (VCLEDs) which are collectively referred to herein as "illuminators." Therefore, the protection afforded the present invention should only be limited in accordance with the following claims, which include all such embodiments and modifications when viewed in conjunction with the above specification and accompanying drawings.

I claim:

1. A power source and control system configured to energize and control a lighting system, the lighting system including a plurality of lighting fixtures, each lighting fixture including one or more lights, each light addressable over a two-wire path, the system comprising:
   a power source input for accepting a first alternating-current (AC) voltage;
   a user interface configured to accept user input and to output information responsive to said user input;
   a processor communicating with said user interface and configured to receive said information and output command and address data responsive to said information to said two-wire path to control at least one of said lights;
   a first rectifier circuit operatively coupled to the power source input configured to rectify the first AC voltage to produce a first direct current (DC) output voltage;
   a first switching circuit operatively coupled to the first rectifier circuit and configured to switch the first DC output voltage to produce a second AC output voltage;
   a transformer operatively coupled to the first switching circuit and configured to transform the second AC output voltage to produce a third AC output voltage;
   a second rectifier circuit operatively coupled to the transformer and configured to rectify the third AC output voltage to produce a second DC output voltage; and
   a second switching circuit operatively coupled to the second rectifier circuit and communicating with the processor, the second switching circuit configured to alternatively apply the second DC output voltage as positive and negative outputs across the two-wire path at a first frequency to produce a fourth AC output voltage to energize the plurality of lighting fixtures, one or more periods of said fourth AC output voltage at said first frequency comprising a first time period, the second switching circuit further configured to periodically encode said command and address data onto the fourth AC output voltage during a second time period less than the first time period by alternatively applying the second DC output voltage as the positive and negative outputs across the two-wire path at a second frequency in accordance with the command and address data to generate a data encoded power signal, the second frequency being substantially higher than the first frequency, and the average DC value of the data encoded power signal being substantially zero.

2. The system of claim 1 wherein at least two electrical conductors of the two-wire path are buried.

3. The system of claim 1 wherein at least one of the first and second switching circuits comprises one or more Metal-Oxide-Semiconductor Field-Effect Transistor (MOSFET) switching devices.

4. The system of claim 1 wherein at least one of the first and second switching circuits comprises one or more Insulated Gate Bipolar Transistor (IGBT) switching devices.

5. The system of claim 1 wherein at least one of the first and second switching circuits comprises one or more the Bipolar Junction Transistor (BJT) switching devices.

6. The system of claim 1 wherein the command and address data is encoded using Manchester encoding and includes a field identifying a destination and a field identifying an intensity.

7. The system of claim 6 wherein the command and address data further includes bits representing a checksum.

8. The system of claim 1 wherein the first frequency is between 0.5 Hz and 10 Hz.

9. The system of claim 1 wherein the second frequency is between 100 Hz and 5 KHz.

10. The system of claim 1 wherein the command and address data is encoded immediately adjacent a rising edge of the fourth AC voltage signal and wherein the command and address data comprises more than one bit.

\* \* \* \* \*